(12) United States Patent
Shin et al.

(10) Patent No.: US 12,738,061 B2
(45) **Date of Patent: *Sep. 15, 2026**

(54) DYNAMICALLY COMPOSABLE OBJECT TRACKER CONFIGURATION FOR INTELLIGENT VIDEO ANALYTICS SYSTEMS

(71) Applicant: NVIDIA Corporation, Santa Clara, CA (US)

(72) Inventors: Joonhwa Shin, Santa Clara, CA (US); Fangyu Li, San Jose, CA (US); Zheng Liu, Los Altos, CA (US); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 18/661,481

(22) Filed: May 10, 2024

(65) Prior Publication Data

US 2024/0303988 A1 Sep. 12, 2024

Related U.S. Application Data

(63) Continuation of application No. 17/503,183, filed on Oct. 15, 2021, now Pat. No. 11,983,928.

(51) Int. Cl.

| | |
|---|---|
| ***G06V 20/40*** | (2022.01) |
| ***G06F 18/22*** | (2023.01) |
| ***G06V 20/10*** | (2022.01) |

(52) U.S. Cl.

CPC .............. *G06V 20/49* (2022.01); *G06F 18/22* (2023.01); *G06V 20/10* (2022.01); *G06V 20/46* (2022.01)

(58) Field of Classification Search

None

See application file for complete search history.

(56) References Cited

U.S. PATENT DOCUMENTS

| | | | | |
|---|---|---|---|---|
| 8,374,388 | B2 * | 2/2013 | Stolkin | G06V 10/75 382/103 |
| 8,989,438 | B2 * | 3/2015 | Moriguchi | G06T 7/277 382/103 |
| 9,020,190 | B2 * | 4/2015 | Fan | G06T 7/246 382/103 |
| 9,087,403 | B2 | 7/2015 | Keating et al. | |
| 9,159,134 | B2 * | 10/2015 | Martinetz | G06T 7/251 |
| 12,314,311 | B2 * | 5/2025 | Goswami | G06F 17/00 |
| 2014/0028714 | A1 | 1/2014 | Keating et al. | |

(Continued)

*Primary Examiner* — Santiago Garcia

(74) *Attorney, Agent, or Firm* — Lowenstein Sandler LLP

(57) ABSTRACT

Apparatuses, systems, and techniques for dynamically composable object tracker configuration for intelligent video analytics systems. A state of one or more objects included in an object is tracked using an object tracking application that implements an object tracker of a first type based on images depicting the environment. A request is received to perform tracking using a second object tracker type that is different from the first object tracker type. The object tracking application is configured to implement an object tracker of the second object tracker type in accordance with the request. The state of the objects in the environment is tracked using the object tracking application that implements the object tracker of the second object tracker type based on the images depicting the environment.

20 Claims, 18 Drawing Sheets

(56) References Cited

U.S. PATENT DOCUMENTS

| | | | | |
|---|---|---|---|---|
| 2017/0091952 | A1* | 3/2017 | Sun | G06T 7/246 |
| 2017/0154212 | A1* | 6/2017 | Feris | G06T 7/13 |
| 2018/0373961 | A1 | 12/2018 | Wang et al. | |
| 2019/0066313 | A1* | 2/2019 | Kim | G06V 10/255 |
| 2019/0073564 | A1* | 3/2019 | Saliou | G06V 10/82 |
| 2019/0073565 | A1* | 3/2019 | Saliou | G06V 10/7784 |
| 2019/0114804 | A1* | 4/2019 | Sundaresan | G06T 7/74 |
| 2020/0007392 | A1 | 1/2020 | Goyal | |
| 2020/0117952 | A1* | 4/2020 | Carroll | G06N 3/0464 |
| 2020/0193552 | A1* | 6/2020 | Turkelson | G06F 18/213 |
| 2020/0380274 | A1 | 12/2020 | Shin et al. | |
| 2021/0035313 | A1 | 2/2021 | Ghadyali et al. | |
| 2021/0133483 | A1 | 5/2021 | Prabhu et al. | |
| 2023/0062785 | A1 | 3/2023 | Yamaji et al. | |
| 2023/0237709 | A1* | 7/2023 | Xu | G06V 10/774<br>345/625 |
| 2025/0285740 | A1* | 9/2025 | Park | G16H 30/40 |
| 2026/0032006 | A1* | 1/2026 | Fei | H04L 9/3271 |

* cited by examiner

700

| OBJECT TRACKER TYPE 702 | OBJECT TRACKER MODULE 704 | | | | | | | |
|---|---|---|---|---|---|---|---|---|
| | DATA ASSOCIATION MODULE 230 | TARGET MANAGER MODULE 232 | OBJECT LOCALIZATION MODULE 234 | DATA EXTRACTION MODULE 236 | | | STATE ESTIMATION MODULE 240 | TRACKLET MANAGER MODULE 242 |
| | | | | DATA TYPE A | DATA TYPE B | DATA TYPE N | | |
| TYPE A | X | X | | | | | | |
| TYPE B | X | X | | | | | X | |
| TYPE C | X | X | X | X | | | X | |
| TYPE D | X | X | X | | X | | X | |
| . . . | | | | | | | | |
| TYPE N | X | X | X | X | X | | X | X |

DYNAMICALLY COMPOSABLE OBJECT TRACKER CONFIGURATION FOR INTELLIGENT VIDEO ANALYTICS SYSTEMS

RELATED APPLICATIONS

This application is a continuation of U.S. patent application Ser. No. 17/503,183, filed on Oct. 15, 2021, the entire contents of which are hereby incorporated by reference herein.

TECHNICAL FIELD

At least one embodiment pertains to processing resources used to configuring an object tracker for an intelligent video analytics system. For example, at least one embodiment pertains to processors or computing systems used to enable an intelligent video analytics system to configure an object tracker based on configuration settings provided by a user of the intelligent video analytics system, according to various novel techniques described herein.

BACKGROUND

Efficient and effective object tracking is a critical task in video monitoring applications, such as video analytics, video surveillance, activity recognition, vehicle navigation, etc. Some systems may utilize one or more object detection models to detect objects included in images depicting an environment. Such systems may estimate a state (e.g., a position, a location, a size, a scale, a velocity, etc.) of the detected object within the environment relative to a camera that generated the images, relative to other objects included in the environment, etc. The system may track the detected object's (also referred to as a target) state in subsequent images depicting the environment and may provide information associated with the target's state to a user of the system (e.g., via a client device, etc.).

BRIEF DESCRIPTION OF DRAWINGS

Various embodiments in accordance with the present disclosure will be described with reference to the drawings, in which:

FIG. 7 illustrates an example graphical user interface (GUI) that enables a user of an object monitoring system to provide one or more settings for configuring an object tracking application, according to at least one embodiment;

DETAILED DESCRIPTION

Figure 1:
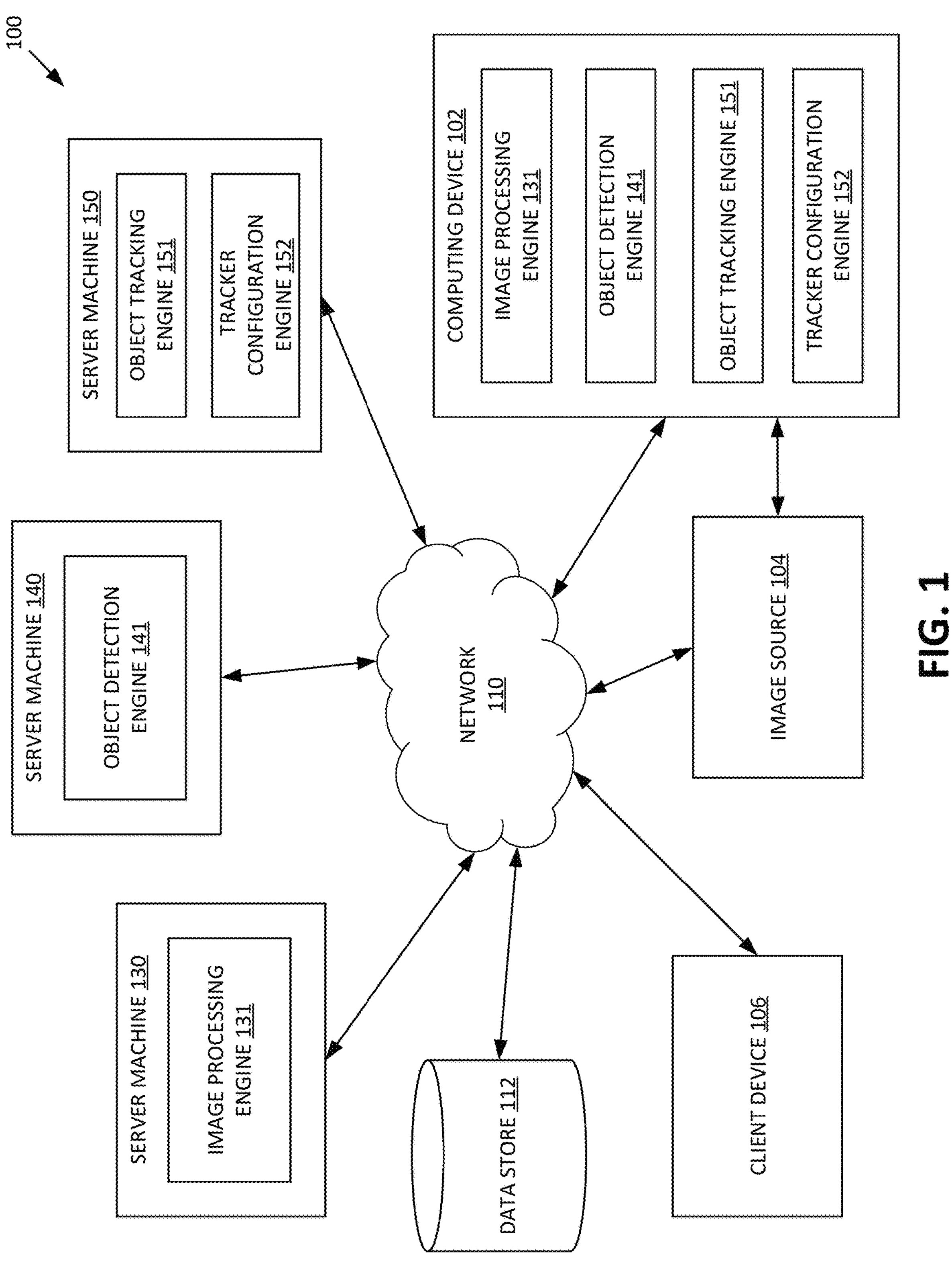
FIG. 1 is a block diagram of an example system architecture, according to at least one embodiment.

Multiple different types of object trackers have been developed to enable tracking of objects in an environment surveilled by a camera. Each type of object tracker offers its own benefits and limitations based on the type of system and/or resources available to a system that is implementing the object tracker, the type of environment and/or objects in the environment that are being surveilled, and/or the overall target accuracy and/or performance conditions imposed on the system. For example, one type of object tracker may be configured to track a detected object based on a metric such as the location or the Intersection-over-Union (IOU) of one or more bounding boxes (e.g., obtained from an output of an object detection model, etc.) corresponding to the detected object in images depicting an environment (referred to herein as a location-based tracker). A location-based tracker may not implement complex feature extraction or visual analysis techniques, and therefore may consume fewer computing resources (e.g., processor cycles, memory storage space, etc.) than other object tracker types that implement such techniques. However, because the location-based tracker may not implement such techniques, the location-based tracker may only be suitable for tracking objects with distinct shapes or sizes that are sparsely located within an environment.

In another example, another type of object tracker may be configured to track a detected object based on visual features extracted from a sequence of images depicting the object in an environment (e.g., using a visual feature extraction model). Such type of object tracker is referred to as a visual feature-based tracker or a feature-based tracker. A visual feature-based tracker may implement visual feature extraction techniques to track a detected object, and therefore may consume a larger amount of computing resources than a location-based tracker. However, the extracted visual features associated with a detected object may enable improved object tracking over the location-based tracker, and thus the visual feature-based tracker may be suitable for tracking a larger number of objects concentrated in an environment.

In yet another example, a discriminative correlation filter (DCF)-type object tracker may be configured to track a detected object based on a visual similarity between regions of a sequence of images that include the object (e.g., indicated by one or more bounding boxes corresponding to the object, a correlation response present in regions including the object, etc.) and/or are expected to include the object (e.g., based on an output of a state estimation function and/or a state prediction model). The DCF-type tracker may consume a larger amount of system resources than other object trackers (e.g., the location-based object tracker), which may result in a lower overall system efficiency and/or a higher overall system latency. However, the DCF-type tracker may be suitable to track a large number of objects concentrated in an environment, and/or objects that undergo occlusions (e.g., objects that seemingly merge or combine with other objects in the environment), which may not be possible using other object trackers.

A user of an intelligent video analytics system, such as (in an example, non-limiting embodiment) an object monitoring system may wish to configure different types of object trackers, depending on current system resource availability and/or conditions or characteristics of the environment and/or objects being surveilled. In one illustrative example, a small number of computing resources may be available to support object monitoring during an initialization of the system and accordingly, the user may configure a location-based tracker to run on the system. Over time, a larger number of computing resources may become available, and the user may wish to configure a visual feature-based tracker and/or a DCF-type tracker. Conventional systems configure object trackers based on distinct sets of program libraries that are particular to each object tracker type. For example, a conventional system configures a location-based tracker by enabling or otherwise activating a distinct set of program libraries that is particular to location-based trackers. To configure a visual feature-based tracker and/or a DCF-type tracker, the conventional system may deactivate or otherwise disable the entire set of location-based object libraries and enable a visual feature-based and/or a DCF-type tracker based on another distinct set of program libraries that is particular to these tracker types. Completely disabling one set of tracker libraries, enabling another set of tracker libraries, and configuring a system to execute an object tracker based on the newly-enabled set of tracker libraries may consume a significant amount of time and computing resources or may disrupt the processing of real-time data (e.g., especially in a streaming analytics system). In accordance with the previous example, visual feature-based and/or DCF-type tracker libraries may perform the same or similar functions as the location-based tracker (e.g., detected object monitoring functions, object data association and/or mapping functions, etc.), while also performing additional functions that are not performed by the location-based tracker (e.g., feature extraction and comparison functions, visual analysis functions, etc.). However, conventional systems do not enable users to leverage the functions performed by a first type of object tracker (e.g., a location-based tracker) to implement a second type of object tracker (e.g., a visual feature-based tracker, a DCF-type tracker, etc.) Further, conventional systems do not enable users to leverage the functions performed by existing types of object trackers to configure custom object trackers based on individual resource availability, distinctive conditions or characteristics of the environment and/or objects being surveilled, etc. associated with a respective intelligent video analytics system.

Embodiments of the present disclosure address the above and other deficiencies by providing a modular intelligent video analytics system (e.g., an object monitoring system) that enables a user to configure an object tracker application using application modules associated with multiple types of object trackers. A library, as provided herein, refers to a collection of resources (e.g., configuration files, executable programs, etc.) allocated to support one or more application modules of an object tracker application. An application module refers to a logical unit (e.g., a container, etc.) configured to execute a particular task associated with the object tracker application. The system of the present disclosure may maintain a set of common modules in different object tracker libraries that are each allocated to support distinct application modules associated with one or more object tracker types (e.g., a location-based tracker, a visual feature-based tracker, a DCF-type tracker, etc.). Each module maintained by the system may be configured to communicate and function with other modules that are activated for the object tracker, in view of configuration settings and/or files provided by a user of the system. Accordingly, a user is enabled to activate or deactivate one or more modules to configure a particular object tracker type (e.g., the location-based tracker, the visual feature-based tracker, a DCF-type tracker, a custom type tracker, etc.) in accordance with respective conditions associated with the intelligent video analytics system and/or the environment and/or objects being surveilled. As a respective module is activated or deactivated, the architecture of the intelligent video analytics system enables composition of an object tracker of the particular tracker type without disruption of the tracker module workflow.

Some application modules may be configured to execute tasks associated with each type of object tracker. For example, for a respective object tracked in an environment (also referred to herein as a target), a data association application module may be configured to obtain data (e.g., state data, etc.) associated with the target in view of a current image depicting the environment and in view of a prior image depicting the environment. The data association module may also be configured to generate a mapping between the object data obtained in view of the first image and the object data obtained in view of the second image. A target management application module may be configured to instantiate an object tracker for the target. The object tracker may monitor a state of the object based on mappings generated by the data association module and, in some embodiments, may be configured to provide an indication of the object state to a user of the system (e.g., via a client device connected to the system). Each type of object tracker supported by the intelligent video analytics system (e.g., location-based tracker, a visual feature-based tracker, a DCF-type tracker, a custom tracker, etc.) may be configured to implement the data association module and the target management module.

Additional modules may be configured to execute distinct tasks associated with particular types of object trackers. For example, a DCF-type tracker may implement one or more modules that enable localization of existing targets tracked by object trackers of the intelligent video analytics system. One or more modules (e.g., an object localization module, a data extraction module, etc.) of the DCF-type tracker may be configured to estimate a location of existing targets tracked by object trackers of the intelligent video analytics system based on a visual similarity between a region of a current image depicting an environment that includes a detected object (e.g., based on one or more bounding boxes obtained from an output of an object detection model, based on a correlation response determined for one or more regions of the image, etc.) and a region of the respective image that is expected to include the detected object (e.g., based on state data or predicted data associated with an existing target in view of one or more prior images). The one or more modules may extract data associated with the region of the current image that includes the detected object and compare the extracted data with corresponding data associated with existing targets (e.g., extracted from prior images depicting the environment). The object localization module may calculate the visual similarity metric value by determining a visual similarity between the detected object and an existing target based on the data extracted by the data extraction module and may calculate a similarity metric value based on the determined visual similarity. The object localization module may provide an indication of the image region that includes the detected object, the image region that is expected to include an existing target, and the calculated visual similarity metric value to the data association module, as described above. In another example, a visual feature-based tracker may also implement a data extraction application module, which may be configured to extract one or more visual features from an image depicting a detected object (i.e., using a feature extraction model) and calculate a feature similarity metric value based on the extracted features and features associated with an existing target extracted from prior image depicting the environment. The data extraction module may provide an indication of the image region that includes the detected object and the calculated feature similarity metric to the data association application module, as described above.

In some embodiments, a user of an intelligent video analytics system may request initialization of a particular type of object tracker (e.g., via a client device connected to the system). For example, the system can receive a request to configure a particular type of object tracker (e.g., in response to the user interacting with a GUI provided by the system, etc.). The system may identify one or more libraries that correspond to the particular type of object tracker and may initialize a first set of application modules based on the one or more identified libraries. Each of the initialized first set of application modules may be configured to communicate and function with the other initialized application modules (i.e., due to the unified architecture provided by embodiments of the present disclosure). The system may configure the object tracking application to execute the initialized first set of application modules (e.g., by updating a configuration file associated with the application to enable the first set of application modules) and may provide the configured object tracking application in accordance with the request.

In additional or alternative embodiments, after initializing an object tracking application to execute a first set of application modules associated with a first object tracker type (e.g., as described above), the system may receive a request to configure the application to execute a second set of application modules associated with a second tracker type. The second set of application modules may include one or more application modules that are different from the modules in the first set of application modules. For example, the first set of application modules may correspond to a DCF-type tracker and may include an object localization module and/or a data extraction module that is configured to extract a particular type of target data from images. The second set of application modules may correspond to a visual feature-based tracker and may include a data extraction module that is configured to extract a different type of target data (e.g., visual feature data) from images. In another example, the second set of application modules may correspond to both a DCF-type tracker and a visual feature-based tracker and therefore may include an object localization module and one or more data extraction modules configured to extract both types of target data from images. The system may configure the object tracking application to execute the second set of application modules (e.g., by updating a configuration file associated with the application), in accordance with the request, and may execute the second set of application modules to perform object tracking for detected objects and/or targets in a surveilled environment.

Aspects and embodiments of the present disclosure provide techniques to enable intelligent video analytics systems to leverage the functions performed by different types of object trackers (e.g., location-based trackers, visual feature-based trackers, DCF-type trackers, etc.) to dynamically configure each different type of object tracker. Embodiments of the present disclosure enable a user of an intelligent video analytics system to provide configuration settings and/or files for configuring a particular type of object tracker that can be used in accordance with system and/or environmental conditions without disabling a set of tracker libraries and re-enabling another set of tracker libraries. Accordingly, a user is enabled to switch between different object tracker types without significant disruption of the overall object tracking functionality provided by the intelligent video analytics system. Further, the modular architecture of the proposed system enables the system to leverage the functions performed by existing object tracker types to develop and implement new object tracker types.

System Architecture

FIG. 1 is a block diagram of an example system architecture 100, according to at least one embodiment. The system architecture 100 (also referred to as "system" herein) may include a computing device 102, an image source 104, one or more client devices 106, one or more data stores 112, and/or server machines (e.g., server machines 130-150), each connected to a network 110. In implementations, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Computing device 102 may be a desktop computer, a laptop computer, a smartphone, a tablet computer, a server, or any suitable computing device capable of performing the techniques described herein. In some embodiments, computing device 102 may be a computing device of a cloud computing platform. For example, computing device 102 may be, or may be a component of, a server machine of a cloud computing platform. In such embodiments, computing device 102 may be coupled to one or more edge devices (not shown) via network 110. An edge device refers to a computing device that enables communication between computing devices at the boundary of two networks. For example, an edge device may be connected to computing device 102, data store 112, server machine 130, server machine 140, and/or server machine 150 via network 110, and may be connected to one or more endpoint devices (not shown) via another network. In such example, the edge device can enable communication between computing device 102, data store 112, server machine 130, server machine 140, and/or server machine 150 and the one or more endpoint devices.

In other or similar embodiments, computing device 102 may be, or may be a component of, an edge device. For example, computing device 102 may facilitate communication between data store 112, server machine 130, server machine 140, and/or server machine 150, which are connected to computing device 102 via network 110, and one or more endpoint devices that are connected to computing device 102 via another network.

In still other or similar embodiments, computing device 102 may be, or may be a component of, an endpoint device. For example, computing device 102 may be, or may be a component of, devices, such as, but not limited to: televisions, smart phones, cellular telephones, personal digital assistants (PDAs), portable media players, netbooks, laptop computers, electronic book readers, tablet computers, desktop computers, set-top boxes, gaming consoles, autonomous vehicles, surveillance devices, and the like. In such embodiments, computing device 102 may be connected to data store 112, server machine 130, server machine 140 and/or server machine 150 via network 110. In other or similar embodiments, computing device 102 may be connected to an edge device (not shown) of system 100 via a network and the edge device of system 100 may be connected to data store 112, server machine 130, server machine 140 and/or server machine 150 via network 110.

Image source 104 may be or may include one or sensors that are configured to generate data, such as visual data, audio data, etc., associated with an environment. The sensors can include an image sensor (e.g., a camera), a light detection and ranging (LIDAR) sensor, a radio detection and ranging (RADAR) sensor, sound navigation and ranging (SONAR) sensor, an ultrasonic sensor, a microphone, and other sensor types. In some embodiments, the data collected and/or generated by the sensors may represent a perception of the environment by the sensors. It should be noted that although some embodiments of the present disclosure are directed to image data (e.g., an image) generated by one or more sensors of image source 104, embodiments of the present disclosure may be applied to any type of data generated by one or more sensors of image source 104 (e.g., LIDAR data, RADAR data, SONAR data, ultrasonic data, audio data, etc.).

In some embodiments, image source 104 may be a component of, or may be otherwise connected to, computing device 102. For example, as described above, computing device 102 may be, or may be a component of, an endpoint device. In such embodiments, image source 104 may be a camera component of computing device 102 that is configured to generate an image and/or video data associated with the environment. In other or similar embodiments, image source 104 may be a device, or a component of or otherwise connected to a device, that is separate and distinct from computing device 102. For example, as described above, computing device 102 may be, or may be a component of, a cloud computing platform or an edge device. In such embodiments, image source 104 may be a device (e.g., a surveillance camera, a device of an autonomous vehicle, etc.) that is connected to computing device 102, data store 112, and/or server machines 130-150 via network 110 or another network.

In some implementations, data store 112 is a persistent storage that is capable of storing content items (e.g., images) and data associated with the stored content items (e.g., object data, image metadata, etc.) as well as data structures to tag, organize, and index the content items and/or object data. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by computing device 102 or one or more different machines coupled to the computing device 102 via network 110 or another network.

Data store 112 may be or may include a domain-specific or organization-specific repository or data base. In some embodiments, computing device 102, image source 104, server machine 130, server machine 140, and/or server machine 150 may only be able to access data store via network 110, which may be a private network. In other or similar embodiments, data stored at data store 112 may be encrypted and may be accessible to computing device 102, image source 104, server machine 130, server machine 140, and/or server machine 150 via an encryption mechanism (e.g., a private encryption key, etc.). In additional or alternative embodiments, data store 112 may be a publicly accessible data store that is accessible to any device via a public network.

Server machine 130 may include an image processing engine 131 that is configured to process data generated by image source 104. For example, image source 104 and/or computing device 102 may encode image data (e.g., using a codec) generated by image source 104 prior to transmitting the image data to another device of system 100 via network 110 (or another network). Image processing engine 131 may decode the encoded image data (e.g., using the codec). In some embodiments, image processing engine 131 may re-encode decoded image data (e.g., using a different codec), prior to providing the image to another component or device of system 100. In some embodiments, image process engine 131 may be configured to select, combine, and transmit signals (e.g., via a multiplexer component, etc.) associated with image data generated by image source 104 to another component or device of system 100. In additional or alternative embodiments, image processing engine 131 may be configured to modify a quality of the image data generated by image source 104 before the image data is used for object detection and/or object tracking (e.g., by object detection engine 141 and/or object tracking engine 151). For example, image processing engine 131 may be configured to apply one or more transformations to an image generated by image source 104 to remove or reduce an amount of noise present in the image, to crop the image, and so on. It should be noted that although some embodiments of the present disclosure provide that image processing engine 131 may modify a quality of image data, other components of system 100 (e.g., object detection engine 141, object tracking engine 151, etc.) may also be configured to modify the quality of the image data.

Server machine 140 may include an object detection engine 141 which is configured to detect one or more objects included in images depicting an environment, such as images generated by image source 104. In some embodiments, object detection engine 141 may provide an image depicting an environment as input to a trained object detection model. The object detection model may be trained using historical data (e.g., historical images, historical object data, etc.) to detect an object (referred to here as a detected object) included in a given input image depicting an environment and estimate a region of the given input image that includes the detected object (referred to herein as a region of interest). In some embodiments, one or more outputs of the object detection model can indicate object data associated with the detected object. The object data may indicate a region of interest of a given input image that includes the detected object. For example, the object data can include a bounding box or another bounding shape (e.g., a spheroid, an ellipsoid, a cylindrical shape, etc.) that corresponds to the region of interest of the given input image. In some embodiments, the object data can include other data associated with the detected object, such as an object class corresponding to the detected object, mask data associated with the detected object (e.g., a two-dimensional (2D) bit array that indicates pixels (or groups of pixels) that corresponds to the detected object), and so forth.

Server machine 150 may include an object tracking engine 151 which is configured to track a state of one or more objects detected in one or more images (e.g., generated by image source 104). For purposes of explanation, an object that is detected by object detection engine 141 is referred to herein as a detected object. An object that is tracked by object tracking engine 151 is referred to herein as a target object or a target. A state of a target, as provided herein, may correspond to a location of an object within an environment depicted by the one or more images, a position of the object within the environment, a scale or size of the object within the environment, a velocity of the object within the environment, and so forth.

In some embodiments, object tracking engine 151 may track a target based on an image including the target and object data (e.g., one or more bounding boxes) associated with the target. Object tracking engine 151 may instantiate an object tracker component (referred to as an object tracker herein) for each detected object in an image depicting the environment. An object tracker may be a logical component that is configured to maintain state data associated with a target within a set of images (e.g., a sequence of video frames) depicting the environment. For example, when an object is initially detected in an image (e.g., a video frame), object tracking engine 151 may instantiate an object tracker to monitor and determine a state associated with the detected object (referred to herein as a current state of the target). Object detection engine 141 may detect the target in other images depicting the environment (e.g., subsequent video frames) and the object tracker associated with the target may determine, for each of the other images, the current state of the target. The object tracker may update state data associated with the object to correspond to the determined current state and store the updated state data (e.g., at data store 112). In some embodiments, the object tracker may further estimate a future state of the target in the environment and may store an indication of the future state (e.g., at data store 112) with the updated state data. Further details regarding object tracking engine 151 are provided herein.

Object tracking engine 151 may include application modules that support one or more object tracking applications executing at devices of system 100. As indicated above, an application module refers to a logical unit (e.g., a container, etc.) configured to execute a particular task associated with an object tracker application. A library refers to a collection of resources (e.g., configuration files, executable programs, etc.) allocated to support one or more application modules of an object tracker application. In some embodiments, server machine 150 (or another server machine of system 100) may include an object tracker configuration engine 152. Tracker configuration engine 152 may configure an object tracker application based on one or more configuration settings and/or configuration files (e.g., provided by a user of system 100). In an illustrative example, a user of system 100 may request (e.g., via a user interface of a client device 106) initialization of an object tracker application to track targets in a given environment. The requested object tracker application may be associated with one or more object tracker types (e.g., a location-based tracker, a visual feature-based tracker, a DCF-type tracker, etc.). The user may provide, via the user interface, an indication of configuration settings associated with one or more application modules to be executed by the object tracker application, in some embodiments. In other or similar embodiments, the user may provide, via the user interface, one or more configuration files associated with the application modules to be executed by the object tracker application. Each of the provided configuration files may include an indication of one or more configuration settings associated with a respective application module. Further details regarding the configuration settings and configuration files are provided below.

Tracker configuration engine 152 may obtain the configuration settings and/or configuration files provided by the user and may identify one or more libraries (e.g., from data store 112) allocated to support each of the application modules for the application requested by the user. In response to identifying the one or more libraries, tracker configuration engine 152 may initialize a set of application modules that correspond to the one or more object tracker types for the requested application. In some embodiments, object tracking engine 151 may already be executing an object tracking application according to a set of application modules (i.e., that were previously initialized by tracker configuration engine 152). In such embodiments, tracker configuration engine 152 may update the set of application modules associated with the object tracking application to include or remove one or more application modules, in accordance with the user request. In response to initializing (or updating) the set of application modules, tracker configuration engine 152 may configure the object tracking application to execute the set of application modules and provide the integrated, configured object tracking application, in accordance with the request. Further details regarding the tracker configuration engine 152 configuring the object tracking engine 151 to execute a particular set of application modules are provided in further detail herein.

As indicated above, a user of system 100 may provide an indication of one or more configuration settings and/or configuration files associated with an object tracking application via a user interface of client device 106. Client device 106 may be, or may be a component of, devices, such as, but not limited to: televisions, smart phones, cellular telephones, personal digital assistants (PDAs), portable media players, netbooks, laptop computers, electronic book readers, tablet computers, desktop computers, set-top boxes, gaming consoles, a computing device for an autonomous vehicles, a surveillance device, and the like.

In some implementations, computing device 102, image source 104, client device 106, data store 112, and/or server machines 130-150, may be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable object detection based on an image. It should be noted that in some other implementations, the functions of computing device 102, image source 104, server machines 130, 140, and/or 150 may be provided by a fewer number of machines. For example, in some implementations, server machines 130, 140, and/or 150 may be integrated into a single machine, while in other implementations server machines 130, 140, and 150 may be integrated into multiple machines. In addition, in some implementations one or more of server machines 130, 140, and 150 may be integrated into computing device 102. For example, as illustrated in FIG. 1, image processing engine 131, object detection engine 141, object tracking engine 151 and/or tracker configuration engine 152 may reside at on computing device 102, in some embodiments. In general, functions described in implementations as being performed by computing device 102 and/or server machines 130, 140, 150 may also be performed on one or more edge devices (not shown) and/or client devices (not shown), if appropriate. In addition, the functionality attributed to a particular component may be performed by different or multiple components operating together. Computing device 102 and/or server machines 130, 140, 150 may also be accessed as a service provided to other systems or devices through appropriate application programming interfaces.

Figure 2:
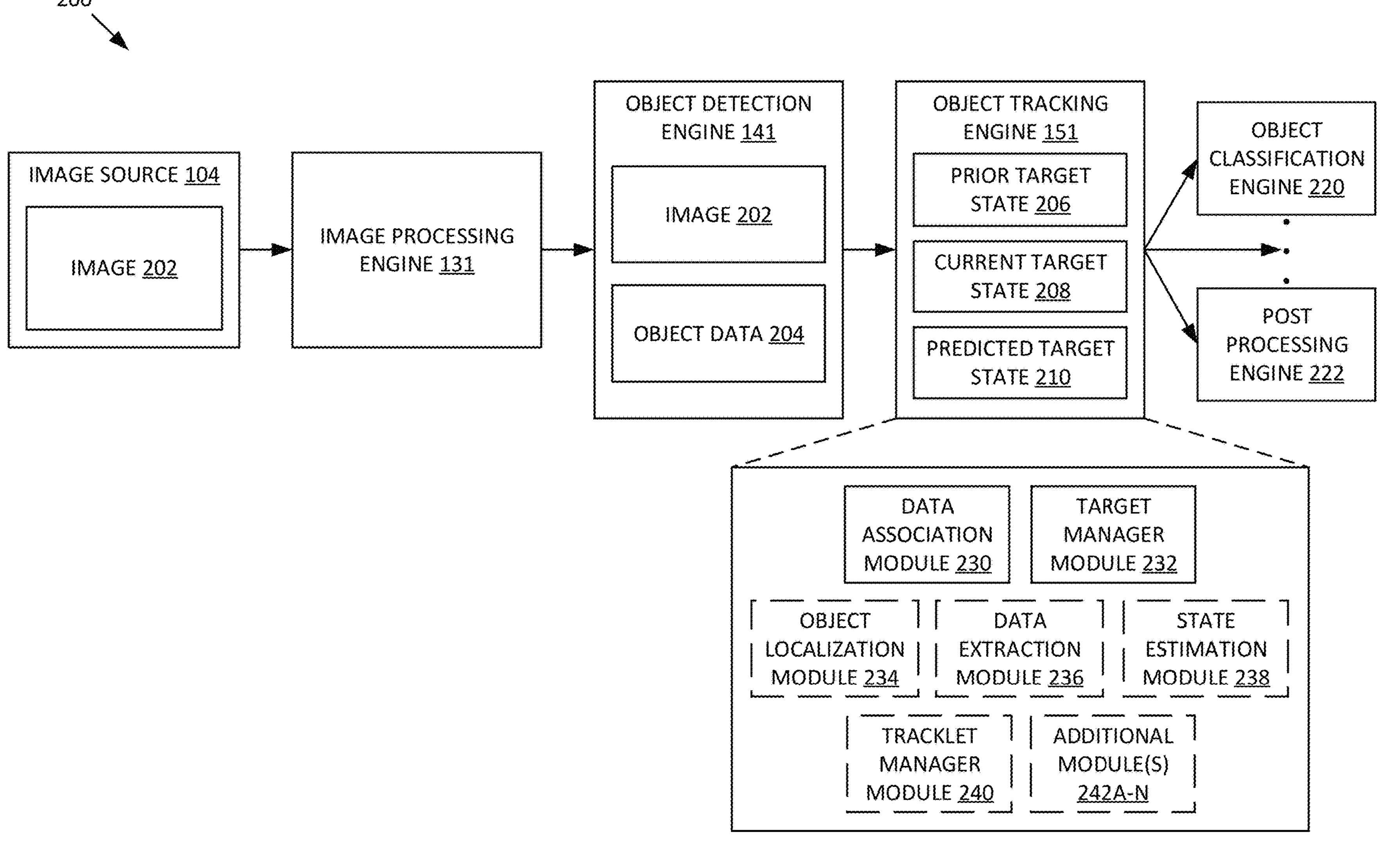
FIG. 2 is a block diagram of an example object monitoring pipeline, according to at least one embodiment.

FIG. 2 is a block diagram of an example object monitoring pipeline 200, according to at least one embodiment. As illustrated in FIG. 2, pipeline 200 may include image source 104, image processing engine 131, object detection engine 141, and/or object tracking engine 151. In some additional or alternative embodiments, pipeline 200 may also include other engines, such as an object classification engine 220, a post processing engine 222, and so forth. As described with respect to FIG. 1, image source 104 may be or may include one or more sensors (e.g., image sensors, etc.) that are configured to generate data associated with an environment. For example, image source 104 may be, or may include, a camera component that is configured to generate a video stream (i.e., a sequence of video frames or image frames) depicting the environment over a period of time. Image source 104 may generate an image 202, in accordance with previously described embodiments, and may provide the image 202 to object detection engine 141. In some embodiments, image source 104 may provide image 202 to image processing engine 131. Image processing engine 131 may process image 202, in accordance with previously described embodiments, and provide image 202 to object detection engine 141.

In response to obtaining image 202, object detection engine 141 may provide image 202 as input to a trained object detection model and obtain one or more outputs of the model that indicate object data 204 associated with one or more objects detected in image 202, as previously described. The trained object detection model may be, for example, an artificial neural network such as a convolutional neural network trained to identify one or more types of objects, such as cars, people, animals, and so on. In some embodiments, object data 204 may include a bounding box (or a bounding shape) that indicates a region of image 202 that includes a detected object. Image 202 and/or object data 204 may be stored at a data store, such as data store 112 described with respect to FIG. 1, data store 350 described with respect to FIG. 3 here, and/or data store 650 described with respect to FIGS. 6A-6D herein.

Object tracking engine 151 may be configured to track a state (e.g., a position, a location, a scale, a size, a velocity, etc.) of one or more targets included in an environment surveilled by image source 104, as described above. In some embodiments, object tracking engine 151 may obtain image 202 and/or object data 204 from object tracking engine 141, from image source 104, and/or via a data store (e.g., data store 112, data store 350, data store 650, etc.). Object tracking engine 151 may determine, based on the obtained image 202 and/or object data 204, whether the environment depicted in image 202 includes an existing target that is tracked by an object tracker of object tracking engine 151. If object tracking engine 151 determines that an existing target is detected in image 202, the object tracker associated with the target may determine a state associated with the target in view of image 202 (e.g., current target state 208). If object tracking engine 151 determines that an existing target is not detected in image 202, object tracking engine 151 may determine to terminate the object tracker associated with the target (e.g., in accordance with a target termination policy for the intelligent video analytics system). Object tracking engine 151 may also determine whether a new object that is not currently tracked by an object tracker is included in image 202. If so, object tracking engine 151 may instantiate a new object tracker to track the object, in accordance with embodiments described herein. The implementation and execution of object tracking engine 151 for a respective object tracking application may depend on a configuration of one or more application modules, as described herein.

As indicated above, tracker configuration engine 152 may initialize one or more application modules to execute tasks associated with tracking targets in an environment. In some embodiments, the one or more application modules may include a data association module 230, a target manager module 232, an object localization module 234, a data extraction module 236, a state estimation module 238, a tracklet manager module 240 and/or one or more additional modules 242A-N. Each of the one or more application modules may be supported by one or more libraries (e.g., stored at data store 112, data store 350, data store 650, etc.), as described herein.

Data association module 230 may be configured to determine an association between an object detected in an environment (e.g., by object detection engine 141 or by object localization module 234, in accordance with embodiments described below) and an existing target that is tracked by an object tracker of object tracking engine 151. In some embodiments, data association module 230 may determine the association based on a proximity of a location that includes the detected object (e.g., indicated by one or more bounding boxes, etc.) and a location associated with an existing target (e.g., an estimated target location, a prior target location, etc.). In other or similar embodiments, data association module 230 may determine the association based on a comparison of other data (e.g., a similarity metric value, visual feature data, an identifier indicating one or more attributes, etc.) associated with the detected object and an existing target. Further details regarding the other data that data association module 230 may use to determine the association between a detected object and an existing target are provided below with respect to object localization module 234 and/or data extraction module 236.

Data association module 230 may provide an indication of an association, or lack of an association, between a detected object and an existing target to target manager module 232. In some embodiments, an association between a detected object and an existing target may indicate to target manager module 232 that the detected object corresponds to the existing target (e.g., the detected object is the same object as the existing target). Target manager module 232 may identify an object tracker that is configured to track a state of the target and provide data (e.g., object data 204) associated with the target to the identified object tracker. The object tracker may update a state associated with the target based on the provided data, in accordance with embodiments provided herein. In other or similar embodiments, a lack of an association between a detected object and an existing target may indicate to target manager module 232 that a detected object is a new, previously unobserved object included in the environment (i.e., and an object tracker has not been instantiated to track the detected object) or that an existing target is not being detected and may no longer be present in the environment. For example, in response to obtaining one or more bounding boxes associated with an object detected in image 202, data association module 230 may provide target manager module 232 an indication that the obtained bounding boxes do not correspond to an existing target. Accordingly, target manager module 232 may determine that the detected object is a new object and may instantiate an object tracker to track a state of the object, in accordance with embodiments described herein. In another example, data association module 230 may provide target manager module 232 that none of the obtained bounding boxes correspond to an existing target. Accordingly, target manager module 232 may determine that the existing target may no longer be present in the environment and may terminate an object tracker associated with the target (e.g., in accordance with a target termination protocol).

Object localization module 234 may be configured to estimate a location of existing targets (also referred to herein as localizing targets) tracked by object tracking engine 151 in a sequence of images 202 generated by image source 104. Data extraction module 236 may be configured to extract data associated with one or more objects detected in an image 202 from the image 202. The type of data that data extraction module 236 extracts from an image 202 may depend on which application modules are activated for a respective object tracking application and/or one or more configuration settings associated with the activated application modules. In some embodiments, the tasks performed by data extraction module 236 may be performed by object localization module 234 (i.e., the tasks for both modules are performed by a single module). This may be the case for some DCF-type object trackers, among other tracker types. In other or similar embodiments, the tasks performed by data extraction module 236 may be distinct from the tasks performed by object localization module 234 (i.e., data extraction related tasks are performed by data extraction module 236 and/or object localization related tasks are performed by object localization module 234). This may be the case for some visual feature-based trackers, among other tracker types. In such embodiments, data extraction module 236 may be configured to perform additional tasks beyond data extraction, in accordance with embodiments provided below. It should be noted that although some embodiments of the present disclosure provide that some tasks may be performed by data extraction module 236 and other tasks may be performed by object localization module 234, such embodiments may be performed if the tasks of data extraction module 236 and object localization module 234 are performed by a single application module, and vice versa.

In some embodiments, object localization module 234 may obtain object data 204 associated with an object detected in an image 202 and determine whether any object trackers have been instantiated to track targets in the environment depicted in image 202. In one illustrative example, object localization module 234 may determine that no object trackers have been instantiated to track targets at the time object tracking engine 151 obtains image 202. In such an example, object localization module 234 may provide an indication of one or more regions of image 202 that include detected objects (e.g., in view of object data 204) to data extraction module 236. Object localization module 234 may also provide to data extraction module 236 an indication of a type of visual features that are to be extracted from the one or more indicated regions of image 202. The visual features may include an indication of one or more colors present in a set of pixels of a region of image 202 indicated by a bounding box (referred to herein as a bounding box region), a Histogram-of-Oriented-Gradient (HOG) of the bounding box region, or other visual features. Data extraction module 236 may extract the indicated visual features from the one or more regions of image 202 and may provide the extracted features to object localization module 234 (and/or store the extracted features in data store 112, data store 350, data store 650, etc.).

In some embodiments, object detection engine 141 may not attempt to detect objects and generate corresponding object data 204 for each image 202 generated by image source 104 (e.g., in accordance with a protocol for the intelligent video analytics system). For example, object detection engine 141 may be configured to attempt to detect objects in every other image 202 generated by image source 104. In such embodiments, object localization module 234 may be configured to detect and localize one or more objects depicted in image 202 using a correlation filter. A correlation filter refers to a class of classifiers that are configured to produce peaks in correlation outputs or responses. In some embodiments, a peak in a correlation output or response can correspond to an object depicted in image 202. In some embodiments, a correlation filter can include at least one of Kernelized Correlation Filter (KCF), a discriminative correlation filter (DCF), a Correlation Filter neural network (CFNN), a Multi-Channel Correlation Filter (MCCF), a Kernel Correlation Filter, an adaptive correlation filter, and/or other types. A correlation filter may be implemented using one or more machine learning models, such as a machine learning model that uses linear regression, logistic regression, decision trees, support vector machines (SVM), Naïve Bayes, K-nearest neighbor (KNN), K-means clustering, random forest, dimensionality reduction algorithms, gradient boosting algorithms, neural networks (e.g., autoencoders, convolutional, recurrent, perceptrons, long/short term memory/LSTM, Hopfield, Boltzmann, deep belief, deconvolutional, generative adversarial, liquid state machine, etc.), and/or other types of machine learning models.

A correlation filter may be trained to produce or identify a peak correlation response at a region of an image that corresponds to a reference coordinate (e.g., a center) of an object depicted in the image. Object localization module 234 may obtain an image 202 (i.e., from image source 104 or via data store 250) and apply the correlation filter to image 202 to obtain one or more outputs. The one or more outputs of the correlation filter can indicate one or more peak locations of a correlation response for image 202 (referred to herein simply as a correlation response). The locations of one or more correlation responses may correspond to regions of image 202 that depict an object in the environment and, in some embodiments, the peak location of the correlation response may correspond to the reference coordinate (e.g., the center) of the depicted object. Object localization module 234 may identify the regions of image 202 that are associated with a respective correlation response as regions of image 202 that depict a respective object (referred to herein as a correlation response region). Object localization module 234 may provide an indication of the regions to data extraction module 236, in addition to or in lieu of an indication of regions of image 202 associated with one or more bounding boxes (referred to herein as bounding box regions), in accordance with previously described embodiments. Data extraction module 236 may extract visual features from the indicated correlation response regions and provide the extracted visual features to object localization module 234, in accordance with previously described embodiments.

In some embodiments, object localization module 234 may apply the correlation filter to an image 202 even if object detection engine 141 generates object data 204 associated with image 202. In such embodiments, object localization module 234 may use object data 204 and the output of the correlation filter to improve (i.e., re-train) the correlation filter for subsequent images (e.g., video frames) generated by image source 104. For example, object localization module 234 may identify the correlation response regions of image 202 based on one or more outputs of the correlation filter. Object localization module 234 may compare the correlation response at the respective correlation response regions of image 202 to each bounding box indicated by object data 204 and determine an accuracy of the respective correlation responses based on the comparison. In some embodiments, object localization module 234 may provide an indication of the correlation responses, the bounding boxes indicated by object data, and/or the determined accuracy of each respective correlation responses to re-train the correlation filter.

In another illustrative example, object localization module 234 may determine that at least one object tracker has been instantiated to track targets at the time object tracking engine 151 obtains image 202. In such embodiments, object localization module 234 may determine an estimated location for each target at the time object tracking engine 151 obtains image 202. In some embodiments, object localization module 234 may estimate the location for a respective target based on a state (e.g., a prior state 206, a current state 208, and/or predicted state 210) of the target. A prior state 206 of a target refers to a state (e.g., a position, a location, a scale, a size, a proximity, etc.) of the target during a time when one or more prior images depicting the environment had been generated. A current state 208 of the target refers to a state of the target during a time when image 202 is generated. A predicted state 208 of the target refers to a state of the target that is estimated for the target at the time image 202 is generated based on one or more prior states of 206 of the target. In some embodiments, the prior state 206, the current state 208, and/or the predicted state 210 of a target may be determined by state estimation module 238, or by other modules in view of object data 204 (e.g., data association module 230, additional modules 242A-N, etc.). Further details regarding determining the state of a target are provided herein.

As indicated above, object localization module 234 may determine an estimated location for a target based on one or more states of the target. For example, in some embodiments, object localization module 234 may obtain (e.g., from data store 112, data store 350, data store 650, etc.) a predicted state for a target. The predicted state may correspond to a location or position of the target at a time that image 202 is generated. Object localization module 234 may estimate the location of the target in image 202 based on the predicted location or position of the target. In another example, object localization module 234 may obtain a prior state for the target, which may correspond to a prior location, position, and/or velocity of the target. Object localization module 234 may estimate the location of the target in image 202 based on the prior location and/or position and the prior velocity of the target, in some embodiments. In response to determining the estimated location of the target in image 202, object localization module 234 may provide an indication of a region of image 202 that corresponds to the estimated location (and an indication of a type of visual features to be extracted) to data extraction module 236, as described above. Object localization module 234 may also provide an indication of a bounding box region and/or a correlation response region associated with a detected object to data extraction module 236 receive, from data extraction module, visual features from the bounding box region and/or the correlation response region, in accordance with previously described embodiments.

Object localization module 234 may generate a set of similarity metric values each indicating a similarity between a detected object (e.g., from image 202) and an existing target. As described above, object localization module 234 may determine that no object trackers have been instantiated for targets at the time image 202 is obtained, and therefore object tracking engine 151 may not be tracking any targets. Accordingly, object localization module 234 may assign the detected object a particular similarity metric (e.g., a low similarity metric value), which indicates that the detected object does not correspond to an existing target. In other or similar embodiments, object localization module 234 may determine that at least one object tracker has been instantiated for a target in the environment. In such embodiments, object localization module 234 may compare the visual features of the detected object (i.e., extracted from the bounding box region and/or the correlation response region of image 202) with the visual features associated with each target tracked by object tracking engine 151 and determine a similarity metric value associated with the extracted visual features based on the comparison. In response to determining that the visual features of the detected object correspond to (e.g., match or essentially match) the visual features associated with a respective target, object localization module 234 may assign a high similarity metric value to the detected object and the target. In response to determining that the visual features of the detected object do not correspond to the visual features associated with the target, object localization module 234 may assign a low similarity metric value to the detected object and the target. Object localization module 234 may generate the set of similarity metric values based on the determined similarity between each detected object and each target tracked by object tracking engine 151.

Object localization module 234 may provide an indication of one or more bounding box regions (and/or correlation response regions), an indication of the estimated target locations, and the set of similarity metric values to data association module 230. Data association module 230 may determine an association between a detected object and an existing target in view of the data provided by object localization module 234, in some embodiments. For example, data association module 230 may determine the association, or lack of an association, between a detected object and a target by determining a proximity of a bounding box region (and/or correlation response region) to an estimated target location, in accordance with previously described embodiments. In some embodiments, data association module 230 may also determine the association based on a similarity metric value between the visual features of the object detected in the bounding box region and/or correlation response region and the visual features of an existing target associated with an estimated location. For example, data association module 230 may determine that a bounding box region associated with a detected object is located within a threshold proximity of a region of image 202 associated with an estimated target location. However, data association module 230 may determine that there is no association between the detected object and the existing target if a similarity metric value determined for the detected object and the existing target do not satisfy a similarity criterion (e.g., the similarity metric value falls below a threshold value). Alternatively, data association module may determine that there is an association between the detected object if the determined similarity metric value satisfies the similarity criterion (e.g., the similarity metric value exceeds the threshold value). Data association module 230 may determine the association, or lack of association, in view of the above, and may provide an indication of the association or lack of association to target manager module 232, in accordance with previously described embodiments.

It should be noted that although some embodiments of the present disclosure are directed to localizing visual features of detected or depicted objects to existing targets, other techniques may be used to localize the existing targets. For example, data extraction module 236 may extract visual features from bounding box regions (and/or correlation response regions) of image 202, in accordance with previously described embodiments. Data extraction module 236, object localization module 234, and/or another module 242 of object tracking engine 151 may provide the extracted visual features as input to a machine learning model (e.g., a recurrent neural network, etc.) and extract, from the one or more obtained outputs, an identifier associated with one or more attributes of the extracted visual features. Data extraction module 236, object localization module 234, and/or another module 242 may compare the extracted identifier to identifiers associated with existing targets and may provide an indication of the comparison to data association module 214, in some embodiments. Data association module 214 may determine an association, or lack of association, between a detected object and an existing target based on the identifier comparison, in accordance with previously described embodiments. For example, if a bounding box region is located within a threshold proximity to an estimated location region and an identifier associated with the detected object corresponds to an identifier for an existing target, data association module 214 may determine that the detected object is associated with the existing target and may provide an indication of the association to target manager module 232.

As indicated above, data extraction module 236 and/or object localization module 234 may be configured to extract different types of object data from image 202 and/or may be configured to implement different types of object localization techniques to localize a target tracked by object tracking engine 151. Tracker configuration engine 151 may configure data extraction module 236 and/or object localization module 234 to extract a particular type of object data and/or implement a particular type of object localization technique in view of one or more settings and/or configuration files associated with an object tracking application. Further details regarding object tracking application configuration are provided with respect to FIG. 3.

As indicated above, an object tracker instantiated for a target may be configured to track a state of the target in an environment. A target state may refer to a location, a position, a scale or size, a velocity, etc., associated with a target during a time period that one or more images 202 are generated. In some embodiments, an object tracker may determine one or more target states (e.g., prior target state 206, current target state 208, future target state 210, etc.) based on state estimation and/or predictions made by state estimation module 238. State estimation module 238 may be configured to estimate a state of a target in a given image based on state data associated with the target at the time an image 202 depicting the target is generated. For example, a current target state 206 may be defined by one or more coordinates (e.g., Cartesian coordinates, etc.) for a bounding box associated with the target in image 202, a size of the bounding box associated with the target, and/or a change in the one or more coordinates for the bounding box relative to prior coordinates of a bounding box associated with the target in one or more prior images depicting a surveilled environment. In another example, the current target state 206 may be further defined by a change in the size of the bounding box associated with the target relative to a bounding box associated with the target in the one or more prior images. In some embodiments, the current target state 206 may also include one or more target features (e.g., extracted from the bounding box region of image 202, extracted from a correlation response region of image 202, etc.).

In some embodiments, state estimation module 238 may determine a current target state 206 based on data obtained for the target from image 202. For example, an object tracker, data association module 230 and/or object localization module 234 may provide an indication of one or more bounding boxes associated with the target to state estimation module 238, in some embodiments. State estimation module 238 may determine the coordinates of the one or more bounding boxes and/or the size of the one or more bounding boxes based on the provided data. In some embodiments, state estimation module 238 may determine whether the target is a new target in image 202 or the target is an existing target that was tracked before image 202 was generated. In response to determining that the target was an existing target, state estimation module 238 may obtain prior target state data 206 for the target (e.g., from data store 112, data store 350, data store 650, etc.). Prior target state data 206 refers to target state data that is estimated (e.g., by state estimation module 238) for a target based on images generated prior to image 202. State estimation module 238 may determine the change in the one or more coordinates for the bounding box associated with the target by determining a distance between the one or more coordinates of the bounding box associated with image 202 and coordinates of a bounding box associated with the target depicted in one or more prior images. State estimation module 238 may determine a speed and direction (i.e., a velocity) at which the target is moving based on the determined distance. In some embodiments, state estimation module 238 may further determine a change in the size or scale of the target based the determined distance.

As indicated above, the change in the one or more coordinates for the bounding box associated with the target depends on the location of a bounding box for an image generated prior to image 202. Accordingly, if a target is a new target in image 202, state estimation module 238 may not determine the change in the location and/or size or scale of the target (i.e., as no prior images generated by image source 104 depict the target). If the target is depicted in subsequent images of the surveilled environment, state estimation module 238 may determine the velocity and/or size or scale change of the target when the subsequent images are generated, in accordance with previously described embodiments.

It should be noted that in some embodiments described herein, object localization module 234 may identify one or more correlation response regions of image 202 (e.g., using a correlation response filter, etc.). In such embodiments, state estimation module 238 may determine the current state of the target based on the identified correlation response regions in addition to or in lieu of the bounding box regions of image 202.

State estimation module 238 may store the coordinates of the one or more bounding boxes, the coordinates of one or more correlation response regions, the size of the one or more bounding boxes and/or the correlation response region, the velocity of the target, and/or the change in size or scale of the target as current target state 208 (e.g., in data 12, data store 350, data store 650, etc.). In some embodiments, state estimation module 238 may be further configured to predict a future state of the target in the environment based on the current target state 208 for the target. In some embodiments, state estimation module 238 may obtain the current target state 206 and provide the current target state 206 as an input to one or more state prediction functions. A state prediction function may be configured to execute a recursive filter, such as a Kalman Filter (KF), to estimate a future state of a target in the environment. State estimation module 238 may obtain an output from the one or more state prediction functions and determine, based on the output, a future state of the target during a time that is subsequent to when image 202 is generated, in some embodiments. In other or similar embodiments, state estimation module 238 may determine multiple future states of the target during a time period that is subsequent to when image 202 is generated. For example, state estimation module 238 may determine, based on the output of the one or more state prediction functions, a future state of the target at each instance of time of a time period that is subsequent to when image 202 is generated. State estimation module 238 may store the one or more future states of the target (e.g., at data store 112, data store 350, data store 650, etc.) as predicted target state 210.

In additional or alternative embodiments, state estimation module 238 may use one or more machine learning models to predict the future state of the target. The one or more machine learning models may include a long term short term memory (LSTM) model, or another type of recurrent neural network (RNN) model. In some embodiments, the one or more machine learning models may be trained using historical object data and/or historical target state data to predict a future state of a target based on given target state and/or object data. State estimation module 238 may provide object data 204, the prior target state 206 and/or the current target state 208 for a target as input to the one or more machine learning models and may obtain an output of the one or more models. State estimation module 238 may extract, from the one or more outputs, multiple sets of state data for the target. Each set of target state data may correspond to a future state of the target at an instance of time that is subsequent to when image 202 is generated. In some embodiments, state estimation module 238 may also extract an indication of a level of confidence that a respective set of state data corresponds to the target. State estimation module 238 may identify one or more sets of state data associated with a level of confidence that satisfies a level of confidence criterion. For example, state estimation module 238 may identify a set of state data that is associated with the higher level of confidence than other sets of state data extracted from the one or more outputs. In another example, state estimation module 238 may identify each set of state data associated with a level of confidence that meets or exceeds a threshold level of confidence. Responsive to identifying the one or more sets of state data, state estimation module 238 may store the one or more sets of state data as predicted target state 210, as described above.

In some embodiments, state estimation module 238 may provide one or more determined target states (e.g., prior target state 206, current target state 208, predicted target state 210, etc.) to other modules of object tracking engine 151. For example, state estimation module 238 may provide an indication of the one or more target states to object localization module 234. Object localization module 234 may use the provided target state(s) to improve (i.e., re-train) the correlation filter for subsequent images generated by image source 104, as described above. In other or similar embodiments, data association module 230 may use a target state information to determine an association between a detected object and an existing target, as described above. State estimation module 238 may provide the one or more determined target states to data association module 230 (e.g., in response to a request from data association module 230, etc.).

As illustrated in FIG. 2, object tracking engine 151 may include other application modules. For example, object tracking engine 151 may include a tracklet manager module 240 that is configured to generate and maintain one or more tracklets associated with targets tracked by object tracking engine 151. A tracklet refers to a set of coordinates that indicates a path that is taken, or is predicted to be taken, by a target in a surveilled environment. Tracklet manager module 240 may use the one or more tracklets to determine whether a lost target (i.e., a target that is not detected in one or more images 202) corresponds to a newly detected object in the environment, and if so, cause the object tracker for the lost target to track the target in view of the newly detected object. Object tracking engine 151 may include any number of additional application modules, such as application modules 242A-N. Application modules 242A-N may be configured to perform one or more of the tasks provided in the present description, or any other tasks not provided in the present description. In an illustrative example, a user of the intelligent video analytics system may program or otherwise develop a new type of application module (e.g., a module or application configured to perform a new type of task, to extract a different type of data from image 202, and/or to localize targets according to a different technique, etc.). The user may provide (e.g., via client device 106) one or more configuration files associated with the new type of application module and tracker configuration engine 152 may initialize the application module to execute in an object tracking application that is supported by object tracking engine 151, in accordance with embodiments described herein.

Embodiments of the present disclosure discuss several different types of application modules that may be executed by object tracking engine 151 to support an object tracking application (e.g., data association module 230, target manager module 232, object localization module 234, data extraction module 236, state estimation module 238, tracklet manager module 240, additional modules 242A-N, etc.). It should be noted that in some embodiments, one or more application modules may be executed by object tracking engine 151 than are illustrated in FIG. 2. In other or similar embodiments, fewer application modules may be executed by object tracking engine 151 than are illustrated in FIG. 2. Object tracking engine 151 may execute at least data association module 230 and target manager module 232 for each object tracking application that is configured by tracker configuration engine 152. Object tracing engine 151 may execute additional application modules (e.g., object localization module, data extraction module 236, state estimation module 238, etc.) in view of one or more configuration settings and/or configuration files (e.g., that are provided by a user of the intelligent video analytics system via client device 106). FIGS. 6A-6D illustrate example object tracking engine 151 configurations, however additional configurations may be possible.

As indicated above, object tracking engine 151 may determine a state (e.g., prior state 206, current state 208, predicted state 210) associated with a target. Object tracking engine 151 may provide an indication of the determined state to other engines of pipeline 200, as illustrated in FIG. 2. For example, object tracking engine 151 may provide an indication of the determined state to an object classification engine 220, which is configured to determine an object class associated with a detected object or target, in some embodiments. In another example, object tracking engine 151 may provide an indication of the determined state to a post processing engine 222, which is configured to perform one or more post-processing functions to image 202 before data associated with image 202 and/or the detected objects or targets in image 202 are provided to a user of the intelligent video analytics system (e.g., via client device 106).

Figure 3:
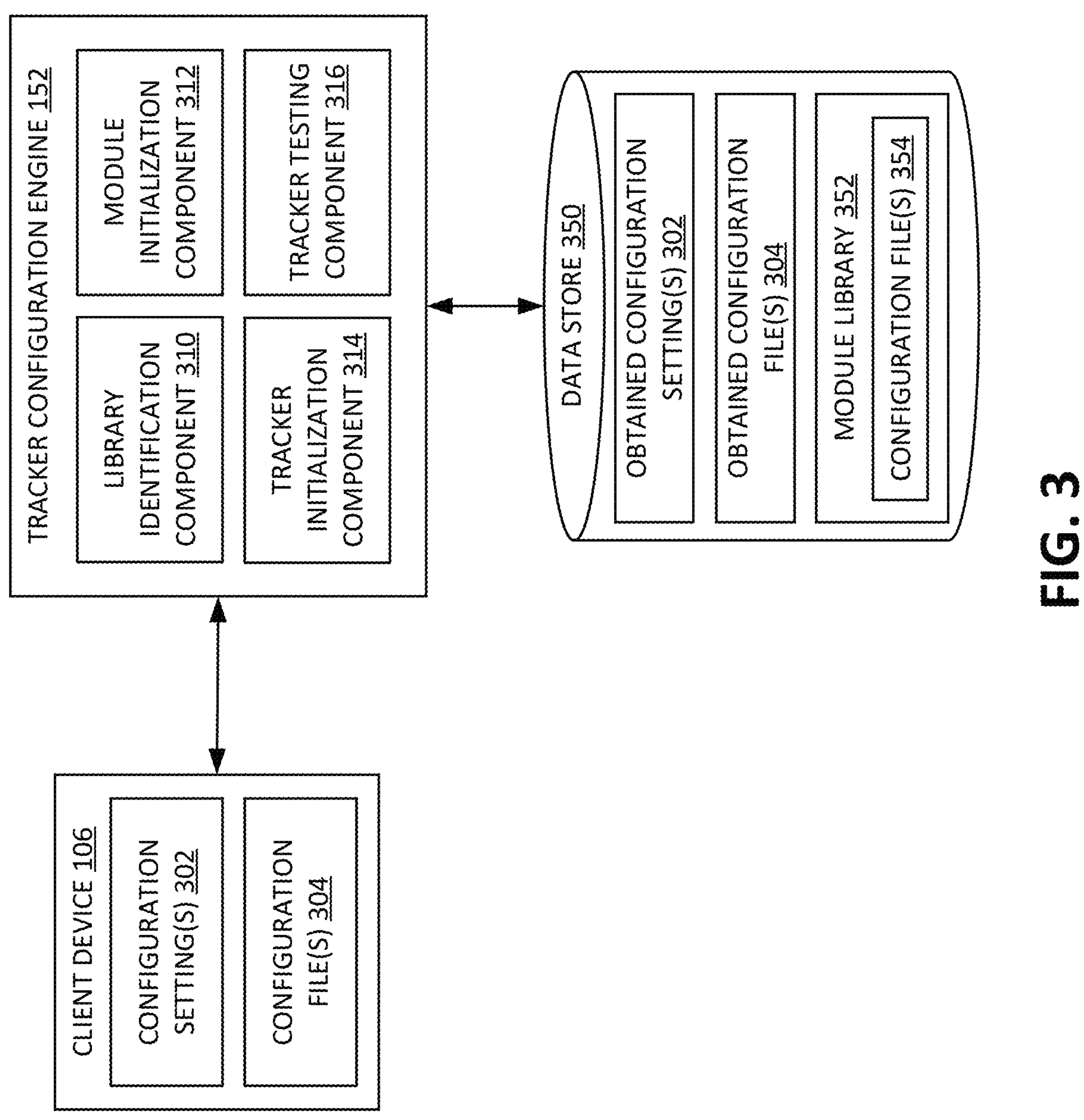
FIG. 3 is a block diagram of an example tracker configuration engine, according to at least one embodiment.

FIG. 3 is a block diagram of an example tracker configuration engine 152, according to at least one embodiment. As described above, tracker configuration engine 152 may configure one or more application modules for an object tracking application running on object tracking engine 151. In some embodiments, tracker configuration engine 152 may configure the one or more application modules based on one or more configuration settings 302 and/or one or more configuration files 304 that are provided by a user via client device 106.

In some embodiments, a user of a client device 106 may provide an indication of configuration settings 302 via a graphical user interface (GUI), such as GUI 700 of FIG. 7. Configuration settings 302 may include an indication of a type of tracker to be implemented for an object tracking application, an indication of one or more modules that are to be activated for an object tracking application, and/or values for one or more configuration parameters associated with executing the respective modules. For example, if a user wishes to activate object localization module 234 for the object tracking application, the configuration parameters associated with the object localization module 234 may include an indication of the object localization technique that is to be implemented by the object localization module 234 (e.g., an indication of whether object localization module 234 is to implement a correlation filter or a recurrent neural network to perform object localization, etc.), an indication of a type and/or characteristics of visual features that are to be used by object localization module 234 to implement the localization technique, an indication of settings associated with one or more machine learning models that are used to implement the localization technique, an indication of one or more characteristics associated with image 202 and/or a prior image that includes an existing target, and so forth. In another example, if a user wishes to activate data extraction module 236, the configuration parameters associated with data extraction module 236 may include an indication of a type and/or characteristics of visual features that are to be extracted from an image 202, characteristics associated with images that are to be used for the future extraction, and so forth. In some embodiments, tracker configuration engine 152 may obtain configuration settings 302 from client device 106 without obtaining configuration files 302.

In other or similar embodiments, a user of a client device 106 may provide one or more configuration files 302 associated with one or more application modules that are to be activated for an object tracking application. A configuration file 304 refers to a file that includes one or more configuration settings 302 and/or additional configuration information associated with an application module of object tracking engine 151 that is to be used by tracker configuration engine 152 to initialize the module. Each configuration file 304 may correspond to a respective application module and, in some embodiments, each application module may be supported by multiple configuration files 304. In some embodiments, a single configuration file 304 may include data for multiple application modules (e.g., for all application modules). In some embodiments, a configuration file 304 may include an indication of a type of application tracker that the file 304 is associated with, a type of module that the file 304 is associated with, and/or one or more configuration parameter values associated with executing the module. The configuration parameter values may include parameter values that are the same or similar to the values described with respect to settings 302, in some embodiments. In additional or alternative embodiments, the configuration parameter values may include one or more parameter values associated with enabling communication between the module and other modules of the object tracking application. For example, a user may provide (via client device 106) a first configuration file associated with executing object localization module 234 and second configuration file associated with executing data association module 230. The first and second configuration files may include configuration parameter values for executing particular tasks associated with the respective modules. In addition, the first configuration file may include additional configuration parameter values associated with enabling object localization module 234 to communicate with data association module 230 (e.g., parameter values that indicate the type of data that is to be transferred from object localization module 234 to data association module 230). The second configuration file may similarly include configuration parameter values associated with enabling data association module 230 to communicate with object localization module 234 (e.g., parameter values that indicate the type of data that data association module 230 is to receive from object localization module 234).

As indicated above, a user may be enabled to execute a custom object tracker application by providing one or more configuration files associated with a new application module. In some embodiments, the one or more configuration files that configure the new application module may update object tracking engine 151 to correspond to a new type of custom object tracker.

Tracker configuration engine 152 may store the configuration settings 302 and/or configuration file(s) 304 obtained from client device 106 at data store 350. In some embodiments, data store 350 may correspond to data store 112 described with respect to FIG. 1 and/or data store 650 described with respect to FIG. 6. Library identification component 310 may identify one or more libraries 352 for an application module associated with the obtained settings 302 and/or files 304. As indicated above, an application module library 352 refers to a set of resources, such as executable program files, configuration file(s) 354, etc., that are used to execute an application module for an object tracking application. If client device 106 only provides an indication of a type of object tracker that the user wishes to implement, library identification component 310 may identify one or more libraries 352 for application modules associated with the object tracker type (e.g., defined by a developer or operator of the intelligent video analytics system, etc.). Alternatively, if client device 106 provides an indication of the one or more particular application modules that the user wishes to implement, library identification component 310 may identify libraries associated with the particular application modules.

In response to library identification component 310 identifying a library 352 associated with the obtained settings 302 and/or file(s) 304, module initialization component 312 may initialize the application module by updating a configuration file 354 of the identified library 352 or libraries to correspond to the obtained settings 302 and/or file(s) 304. If tracker configuration engine 152 obtains a configuration file 304 associated with the module, module initialization component 312 may update configuration file(s) 354 to correspond to the obtained configuration file 304 (e.g., replace configuration files 354 with obtained configuration files 304). If tracker configuration engine 152 obtains configuration settings 302 associated with the module instead of configuration files 304, module initialization component 312 may update configuration file(s) 354 in view of the obtained settings 302. For example, module initialization component 312 may update a corresponding setting of configuration file 354 to correspond to a respective setting of obtained settings 302. As indicated above, in some embodiments, obtained configuration settings 302 may only include an indication of a type of object tracker that a user chooses to implement and/or one or more particular application modules that the user chooses to implement (e.g., without indication of one or more parameter values associated with executing the application modules). In some embodiments, module initialization component 312 may be configured to initialize the configuration files 354 of the identified libraries 352 according to one or more default settings (e.g., defined by a developer or operator of the intelligent video analytics system, etc.).

Tracker initialization component 314 may initialize an object tracker application based on the application modules initialized by module initialization component 312. In some embodiments, tracker initialization component 312 may initialize the object tracker application by updating parameter values of one or more configuration file(s) 354 associated with the object tracking application to enable communication between the modules. For example, if object localization module 234 is activated for an object tracking application, tracker initialization component 314 may update one or more parameter values of configuration file(s) 354 associated with object localization module 234 to enable communication to data association module 230, data extraction module 236, etc., as described above. Similarly, tracker initialization component 314 may update one or more parameter values of configuration file(s) 354 associated with data association module 230, data extraction module 236, etc. to enable communication with object localization module 234. In some embodiments, obtained configuration file(s) 304 may include one or more parameter values associated with enabling communication between different application modules of the object tracker application. In such embodiments, tracker initialization component 314 may not update the configuration file(s) 354 for the activated modules (i.e., as file(s) 354 already enable communication between the different application modules).

Tracker testing component 316 may implement one or more tests for the initialized object tracking application before the object tracking application is executed to track targets in a surveilled environment. For example, tracker testing component 216 may provide test data (not shown) including one or more test images and/or test object data to the initialized object tracking application. Tracker testing component 216 may evaluate the execution of the object tracking application for the provided test data to detect any errors associated with the object tracking application. If any errors are detected, tracker testing component 216 may update one or more parameter values included in one or more configuration file(s) 354 to address the errors, in some embodiments. In other or similar embodiments, tracker testing component 216 may transmit a notification to client device 106 indication that the object tracking application, as configured, cannot be executed. If tracker testing component 216 does not detect any errors associated with the object tracking application, tracker configuration engine 152 may provide the object tracking application to be used to track targets in a surveilled environment, in accordance with previously described embodiments.

Figure 4:
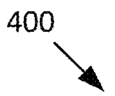
FIG. 4 illustrates a flow diagram of an example method of configuring an object tracker for an intelligent video analytics system, according to at least one embodiment, according to at least one embodiment.
Figure 4:
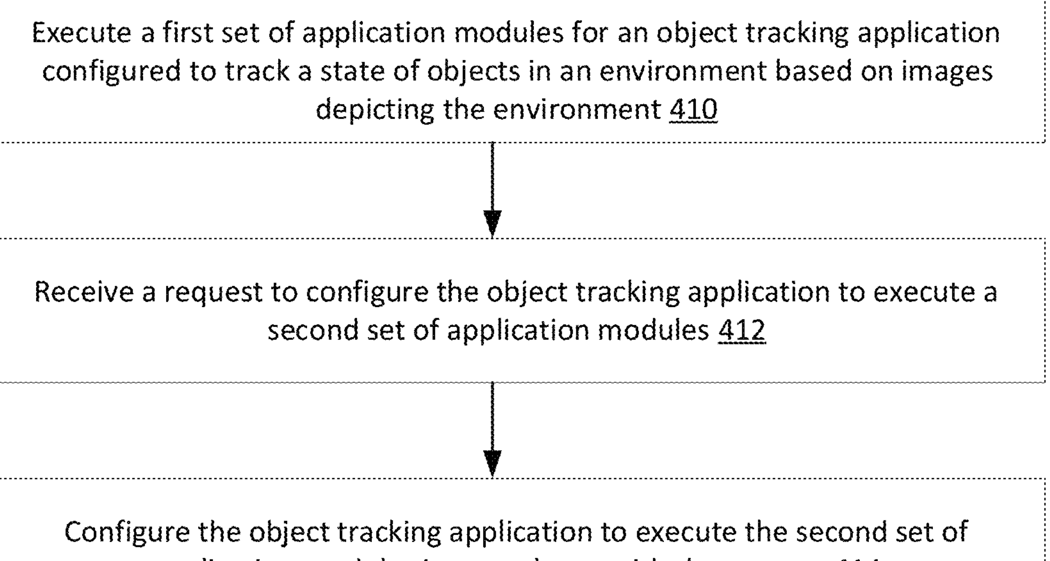
Figure 5:
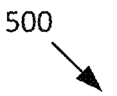
FIG. 5 illustrates a flow diagram of another example method of configuring an object tracker for an intelligent video analytics system, according to at least one embodiment.
Figure 5:
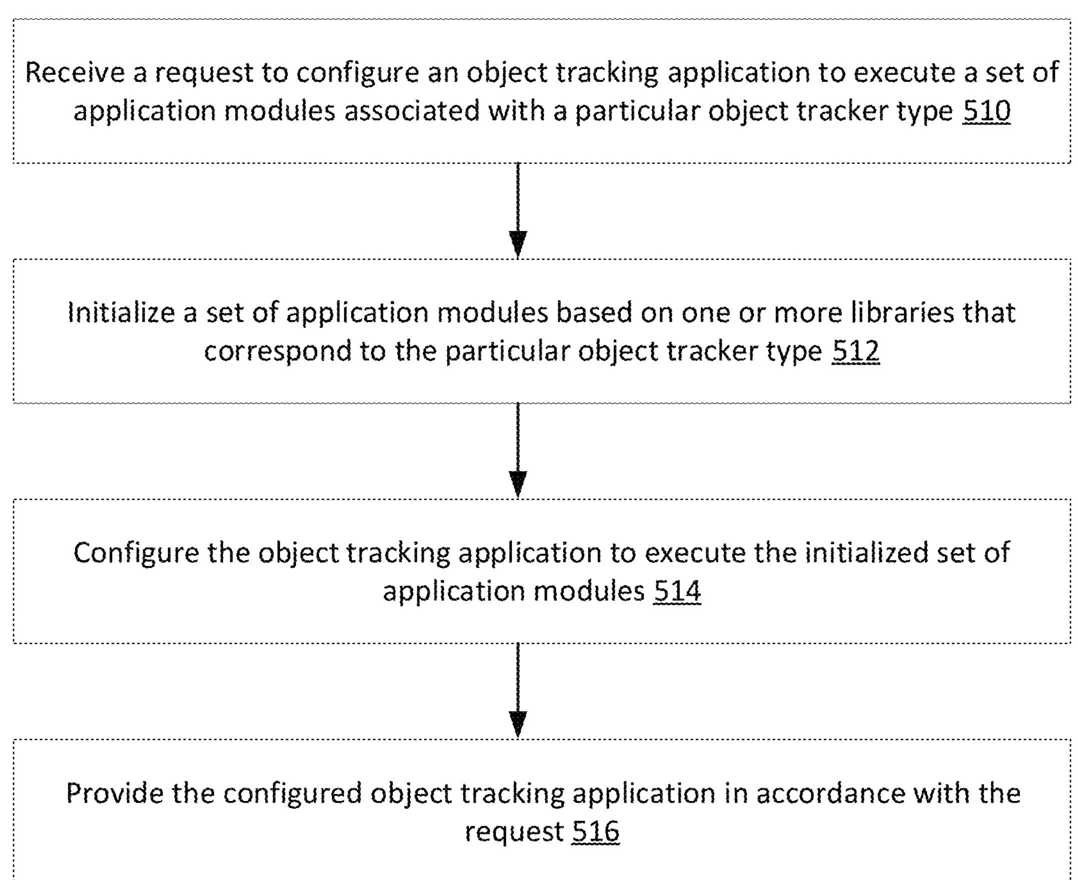

FIGS. 4 and 5 are flow diagrams of example methods 400 and 500, respectively, which are related to configuring an object detection engine, according to at least some embodiments. In at least one embodiment, methods 400 and 500 may be performed by computing device 102, client device 106, server machine 130, server machine 140, server machine 150, one or more edge devices, one or more endpoint devices, or some other computing device, or a combination of multiple computing devices. Methods 400 and 500 may be performed by one or more processing units (e.g., CPUs and/or GPUs), which may include (or communicate with) one or more memory devices. In at least one embodiment, methods 400 and 500 may be performed by multiple processing threads (e.g., CPU threads and/or GPU threads), each thread executing one or more individual functions, routines, subroutines, or operations of the method. In at least one embodiment, processing threads implementing methods 400 and 500 may be synchronized (e.g., using semaphores, critical sections, and/or other thread synchronization mechanisms). Alternatively, processing threads implementing methods 400 and 500 may be executed asynchronously with respect to each other. Various operations of methods 400 and 500 may be performed in a different order compared with the order shown in FIGS. 4 and 5. Some operations of the methods may be performed concurrently with other operations. In at least one embodiment, one or more operations shown in FIGS. 4 and 5 may not always be performed.

FIG. 4 illustrates a flow diagram of an example method 400 of configuring an object tracker for an intelligent video analytics system, according to at least one embodiment. In some embodiments, one or more operations of method 400 may be performed by one or more components of tracker configuration engine 152, described herein. Processing units performing method 400 may execute a first set of application modules for an object tracking application configured to track a state of objects in an environment based on images depicting the environment. In some embodiments, the first set of application modules may be associated with a first object tracker type. For example, the first set of application modules may be associated with a location-based tracker type. Accordingly, the first set of application modules may include data association module 230 and target manager module 232.

At block 412, processing units performing method 400 may receive a request to configure the object tracking application to execute a second set of application modules. The second set of application modules may be associated with a second object tracker type. In some embodiments, the request may be received from client device 106. In such embodiments, the request may include one or more configuration settings 302 and/or configuration files 304. In accordance with the previous example, the second set of application modules may correspond to a DCF-type tracker. Accordingly, the second set of application modules may include data association module 230, target manager module 232, object localization module 234, data extraction module 236 and/or state estimation module 238.

At block 414, processing units performing method 400 may configure the object tracking application to execute the second set of application modules in accordance with the request. Processing units performing method 400 may configure the object tracking application in accordance with embodiments described with respect to FIG. 3. For example, module initialization component 312 of tracker configuration engine 152 may update configuration file(s) 354 for one or more application modules of the second set of application modules in view of the settings 302 and/or file 304 included in the request. Tracker initialization component 314 may update one or more additional parameter values of the file(s) 354 to enable communication between each of the second set of application modules, in accordance with previously described embodiments.

In some embodiments, configuring the object tracking application may involve enabling or disabling application modules of the first set of application modules that are different from the second set of application modules. For example, if the first set of application modules is associated with a location-based tracker and the second set of application modules is associated with a DCF-type tracker, tracker configuration engine 152 may enable (i.e., activate) object localization module 234, data extraction module 236 and/or state estimation module 238 in configuring the object tracking application. If, however, the first set of application modules is associated with a DCF-type tracker and the second set of application modules is associated with a location-based tracker, tracker configuration engine 152 may disable (i.e. deactivate) object localization module 234, data extraction module 236 and/or state estimation module 238 in configuring the object tracking application.

At block 416, processing units performing method 400 may execute the second set of application modules for the object tracking application to track the state of the objects in the environment based on the images depicting the environment. In some embodiments, processing units performing method 400 may execute the second set of application modules by providing the object tracking application for execution via object tracking engine 151.

As indicated with respect to FIG. 4, in some embodiments, an object tracking application may operate in view of a first set of application modules of a first type and a user may request, during operation, reconfiguration of the object tracking application in view a second set of application modules of a second type. In some embodiments, after tracker configuration module 152 reconfigures the object tracking application in view of the second set of application modules, the object tracking application may activate, via object tracking engine 151, one or more new object trackers for the targets according to the updated configuration files for the reconfigured object tracking application. In other or similar embodiments, the object tracking application may execute the previous object trackers for the targets according to the prior configuration files and may instantiate new object trackers to track new targets that are detected in images 202. The previous object trackers may eventually track targets according to the updated configuration files (e.g., based on new or updated state data that is collected for the targets, etc.).

FIG. 5 illustrates a flow diagram of another example method 500 of configuring an object tracker for an intelligent video analytics system, according to at least one embodiment. In some embodiments, one or more operations of method 500 may be performed by one or more components of tracker configuration engine 152, described herein. Processing units performing method 500 may receive a request to configure an object tracking application to execute a set of application modules associated with a particular object tracker type. Processing units performing method 500 may receive the request in accordance with previously described embodiments. At block 512, processing units performing method 500 may initialize a set of application modules based on one or more libraries that correspond to the particular object tracker type. As described above, library identification component 310 may identify module libraries 352 for the set of application modules (e.g., via data store 350). Module initialization component 312 may initialize the set of application modules by updating one or more configuration files 354 of the identified libraries 352 to correspond to settings 302 and/or files 304 of the received request.

At block 514, processing units performing method 500 may configure the object tracking application to execute the initialized set of application modules. Tracker initialization component 314 may update one or more parameters to enable communication between the initialized set of application modules, as described above. At block 516, processing units performing method 500 may provide the configured object tracking application (e.g., to the requestor, for execution via object tracking engine 151, etc.) in accordance with the request.

Figure 6A:
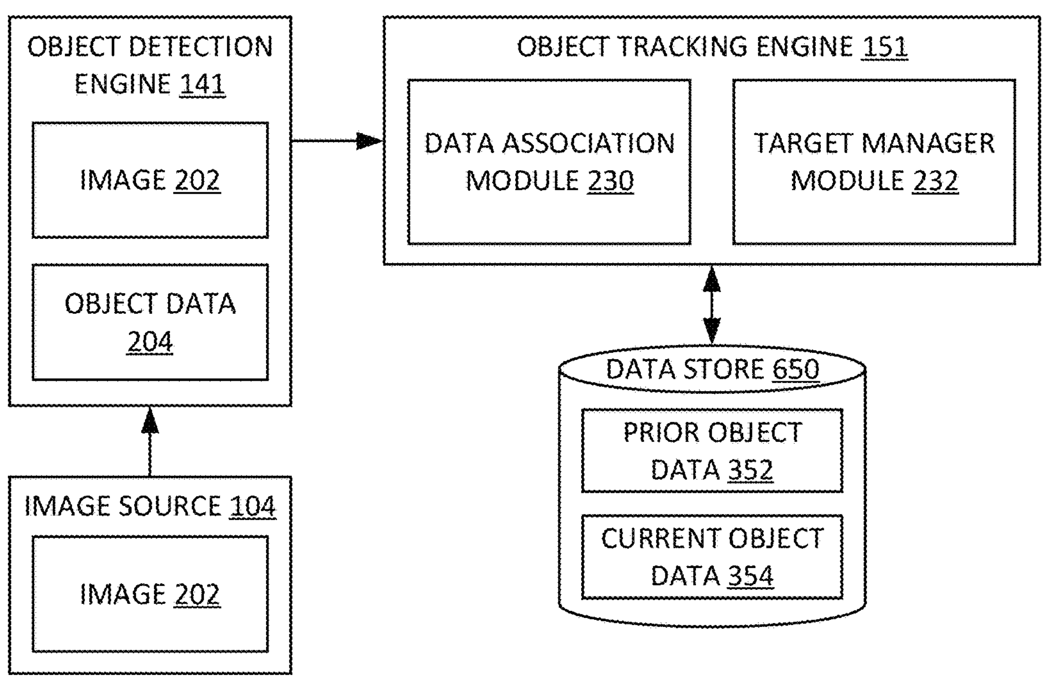
FIGS. 6A-D illustrate example object tracking engines for object tracking applications configured by a tracker configuration engine, according to at least one embodiment.

FIGS. 6A-D illustrate example object tracking engines 151 for applications that are configured by tracker configuration engine 152, according to at least one embodiment. FIG. 6A illustrates an example object tracking engine 151 for an application configured to execute a location-based tracker. As illustrated in FIG. 6A, object tracking engine 151 may include data association module 230 and target manager module 232. As described with respect to FIG. 2, object tracking engine 151 may be configured to obtain object data 204 associated with image 202 from object detection engine 141 and determine whether an object associated with obtained object data 204 (i.e., current object data 654 at data store 650) is associated with an existing target tracked by object tracker engine 151. In some embodiments, data association module 230 may determine whether the object is associated with the existing target based on prior object data 204 associated with the existing target and current object data associated with the detected object. Data association module 230 may provide an indication of an association, or a lack of an association, between the object and the existing target manager module 232. Target manager module 232 may instantiate an object tracker for the detected object, terminate an object tracker for the detected object, and/or cause an object tracker to update a state for the existing target based on the received indication, in accordance with previously described embodiments.

Figure 6B:
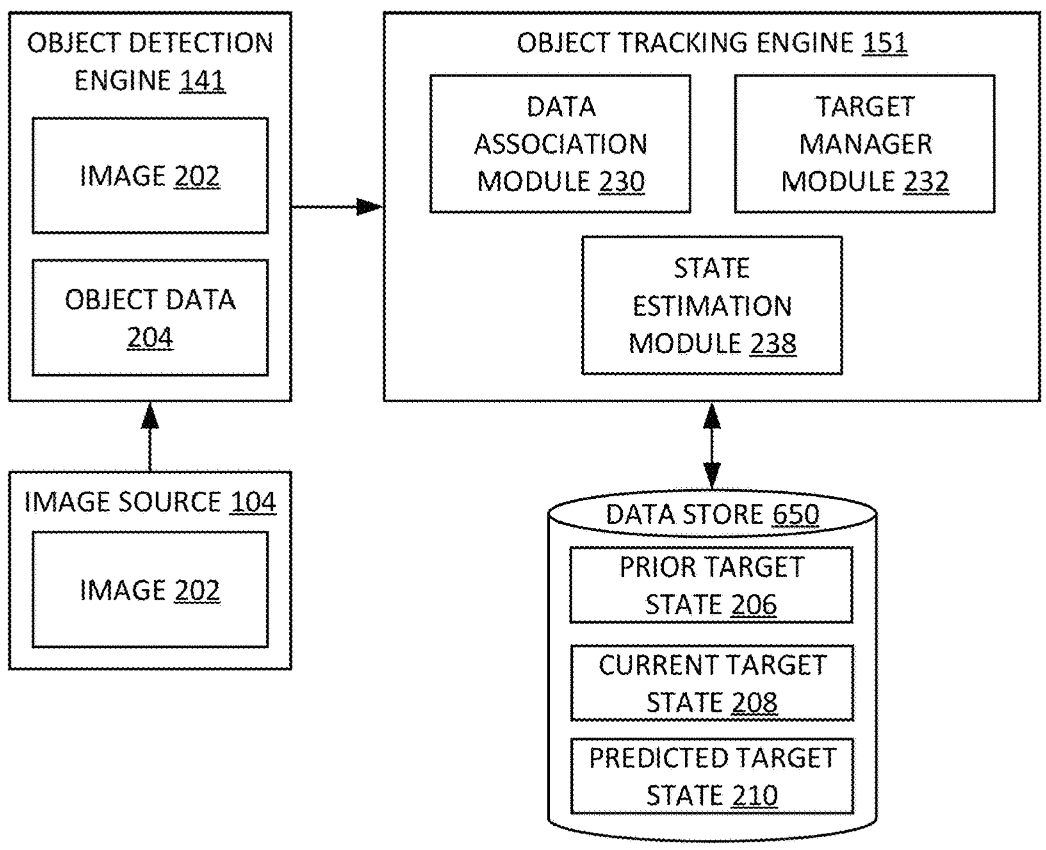

FIG. 6B illustrates an example object tracking engine 151 for an application configured to execute another type of object tracker (e.g., a "simple, online, real-time object tracker" or "SORT" tracker). As illustrated in FIG. 6B, object tracking engine 151 may include data association module 230, target manager module 232, and state estimation module 238. Data association module 230 and target manager module 232 may be configured to track targets in accordance with embodiments described with respect to FIG. 2 and FIG. 6A. Data association module 230 and target manager module 232 may also be configured to provide state data to state estimation module 238, which may be configured to determine a prior target state 206, a current target state 208, and/or a predicted target state 210 associated with the target, in accordance with previously described embodiments. In some embodiments, data association module 230 may be further configured to determine an association between a detected object and an existing target based on a prior target state 206 and/or a predicted target state 210 associated with the existing target.

Figure 6C:
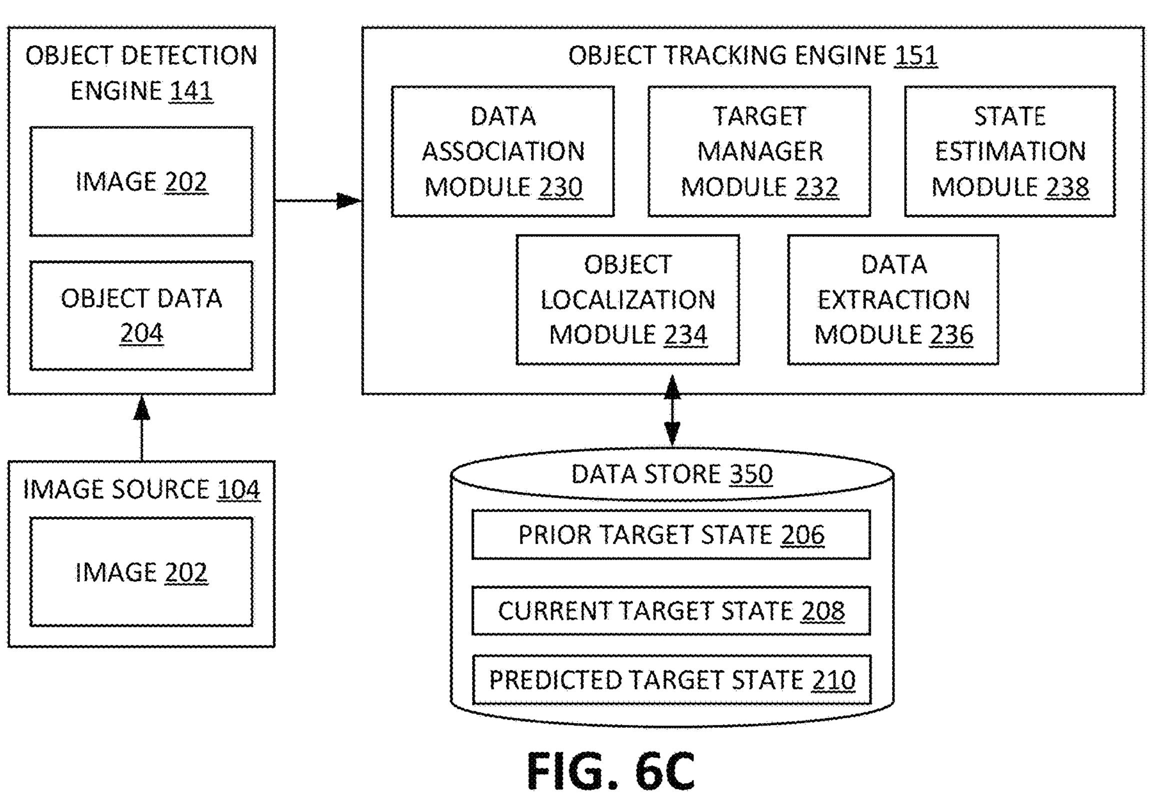

FIG. 6C illustrates an example object tracking engine 151 for an application configured to execute a visual-feature based tracker and/or a DCF-type tracker. As illustrated in FIG. 6C, object tracking engine 151 may include data association module 230, target manager module 232, state estimation module 238, object localization module 234, and/or data extraction module 236. In some embodiments, object localization module 234 may be configured to localize existing targets in view of image 202 and object data 204, in accordance with previously described embodiments. Object localization module 234 may implement a DCF model to localize the existing targets and/or a recurrent neural network to localize the existing targets, depending on the configuration settings associated with the configuration files for the application. Data extraction module 236 may be configured to extract data from image 202 that is used by object localization module 234 to localize the exiting targets, in accordance with previously described embodiments. Object localization module 234 may provide an indication of bounding box regions (or correlation response regions), estimated target locations, and/or similarity metrics to data association module 230, in accordance with previously described embodiments. Data association module, target manager module 232 and state estimation module 238 may perform similar tasks as provided herein.

Figure 6D:
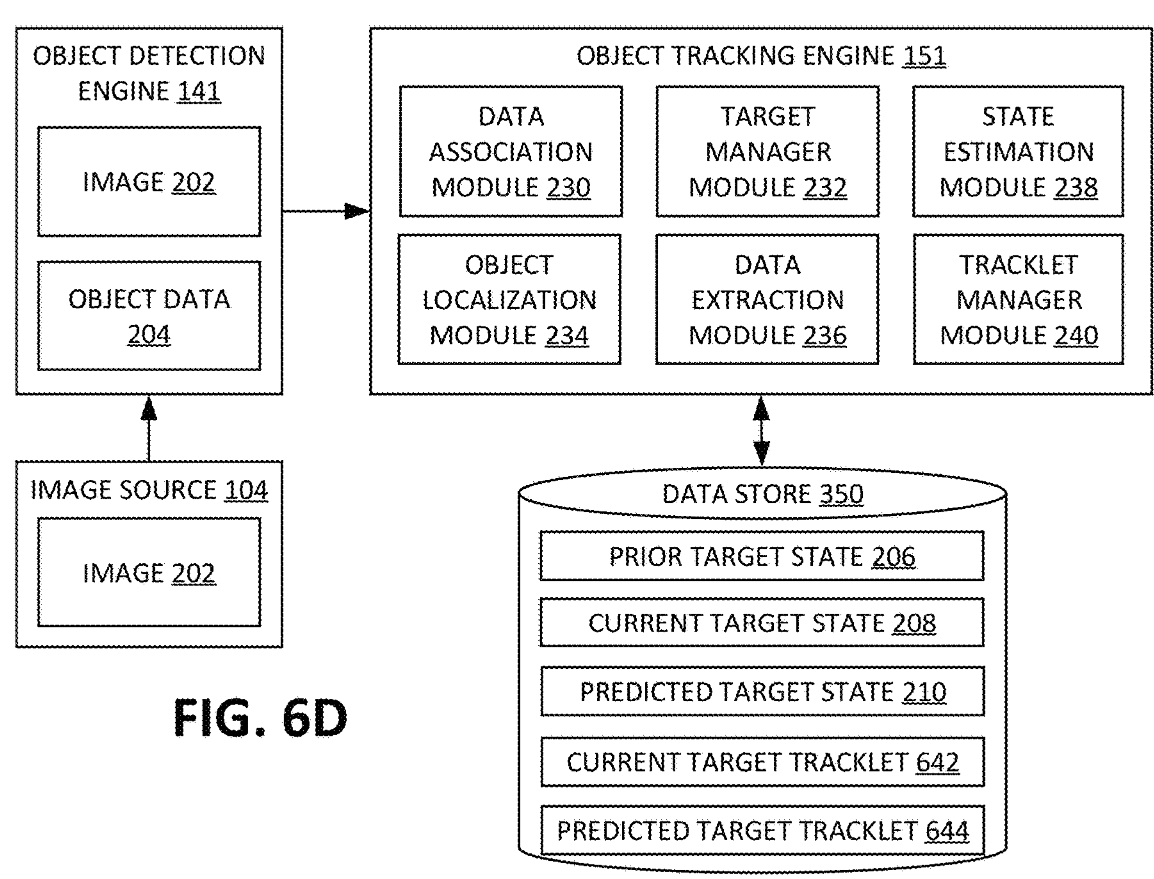

FIG. 6D illustrates an example object tracking engine 151 for an application configured to execute any of the previously described trackers, with the added functionality of tracklet management. In some embodiments, the object tracking engine 151 of FIG. 6D may be for an application configured to execute a custom object tracker. As illustrated in FIG. 6D, object tracking engine 151 may include the same or similar modules as included for the object tracking engines 151 illustrated in FIGS. 6A-6C, as well as a tracklet manager module 240. Tracklet manager module 240 may be configured to generate a current target tracklet 642 and/or a predicted target tracklet 244 for one or more targets tracked by object tracking engine 151. Tracklet manager module 240 may generate tracklets 642 and/or 644 based on prior target state 206, current target state 208, and/or predicted target state 210. In response to detecting that a target is lost (i.e., a target is not detected in a current image depicting an environment), tracklet manager module 240 may compare a predicted target tracklet 644 for a lost target to a current target tracklet 642 associated with a new object detected in image 202. If target manager module 240 determines that the tracklet 644 corresponds to the tracklet 642, tracklet manager module 240 may determine that the new object is the same as the lost target and may cause an object tracker associated with the lost target to track the target in view of state data obtained for the new object.

As indicated above, FIGS. 6A-6D illustrate example object tracking engines 151 for applications configured in accordance with embodiments of the present disclosure. It should be noted that other types of application modules and/or other types of configurations may be implemented in accordance with embodiments of the present disclosure. The examples provided by FIGS. 6A-6D are merely provided for illustrative purposes and are not intended to be limiting whatsoever.

At any time, processing logic may adjust configuration settings of one or more configuration files to transition between any of the example tracking engines of FIGS. 6A-6D and/or other types of tracking engines. The various application modules may be part of a single unified tracking framework, in which application modules for the tracking engine may be activated, deactivated and/or reconfigured based on an update to one or more configuration files.

FIG. 7 illustrates an example graphical user interface (GUI) 700 that enables a user of an intelligent video analytics system to provide one or more settings for configuring an application executing on object tracking engine 151, according to at least one embodiment. GUI 700 may be provided to a user of the intelligent video analytics system, via client device 106, in accordance with previously described embodiments. GUI 700 may provide one or more first sections that enable a user to select a particular type 702 of object tracker to be implemented for the object tracking application. For example, a user may engage with a GUI element associated with object tracker type A if the user wishes to implement an object tracker that includes a data association module 230 and a target manager module 232 (i.e. a location-based tracker). In another example, a user may engage with a GUI element associated with object tracker type C if the user wishes to implement an object tracker that includes a data association module 230, a target manager module 232, an object localization module 234, and a data extraction module 236. In some embodiments, the user may interact with another GUI element to indicate the type of data that the user wishes to be extracted from images by data extraction module 236. In other or similar embodiments, the user may interact with yet another GUI element to indicate the type of object localization technique that the user wishes the object localization module 234 to implement (not shown).

In additional or alternative embodiments, GUI 700 may provide one or more second sections that enable a user to select particular application modules 704 that the user wishes to be implemented by the configured object tracking application. For example, the user may select respective GUI elements associated with a data association module 230 and target manager module 232 if the user wishes to configure an object tracker that implements these modules. The user may also configure a custom object tracker by selecting respective GUI elements associated with modules that the user wishes to configure.

Inference and Training Logic

Figure 8A:
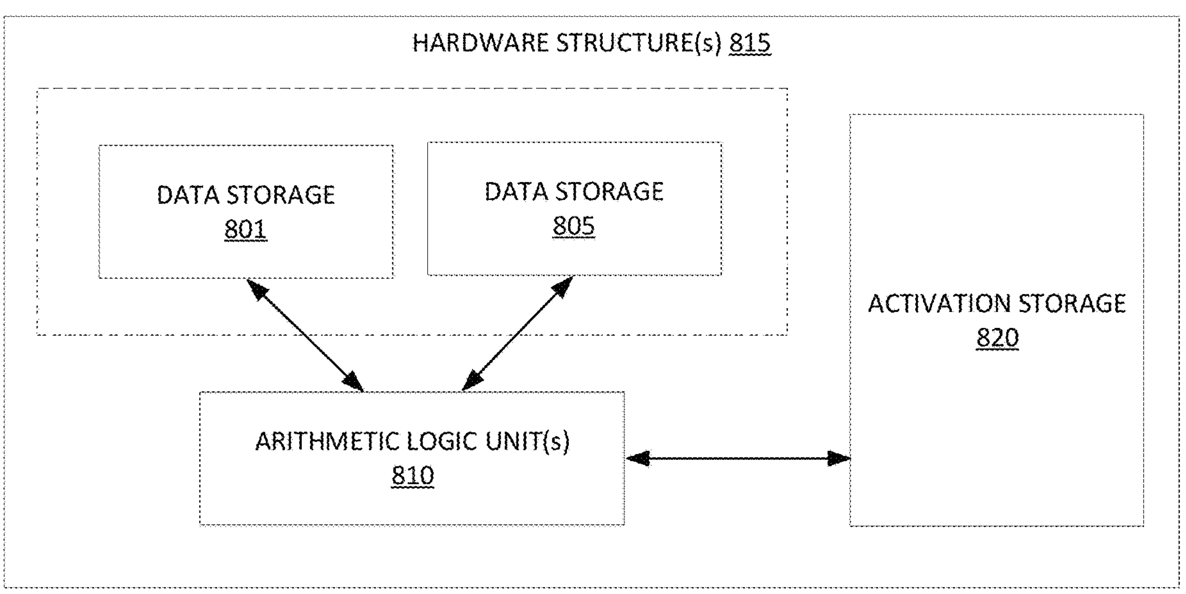
FIG. 8A illustrates inference and/or training logic, according to at least one embodiment.

FIG. 8A illustrates inference and/or training logic 815 used to perform inferencing and/or training operations associated with one or more embodiments. Details regarding inference and/or training logic 815 are provided below in conjunction with FIGS. 8A and/or 8B.

In at least one embodiment, inference and/or training logic 815 may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic 815 may include, or be coupled to code and/or data storage 801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 815 may include, or be coupled to code and/or data storage 805 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to on one or more processors or other hardware logic devices or circuits. In at least one embodiment, code and/or data storage 805 may be cache memory, DRAM, SRAM, non-volatile memory (e.g., Flash memory), or other storage. In at least one embodiment, choice of whether code and/or data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be same storage structure. In at least one embodiment, code and/or data storage 801 and code and/or data storage 805 may be partially same storage structure and partially separate storage structures. In at least one embodiment, any portion of code and/or data storage 801 and code and/or data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 820 that are functions of input/output and/or weight parameter data stored in code and/or data storage 801 and/or code and/or data storage 805. In at least one embodiment, activations stored in activation storage 820 are generated according to linear algebraic and or matrix-based mathematics performed by ALU(s) 810 in response to performing instructions or other code, wherein weight values stored in code and/or data storage 805 and/or code and/or data storage 801 are used as operands along with other values, such as bias values, gradient information, momentum values, or other parameters or hyperparameters, any or all of which may be stored in code and/or data storage 805 or code and/or data storage 801 or another storage on or off-chip.

In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 801, code and/or data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 815 illustrated in FIG. 8A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8A may be used in conjunction with central processing unit ("CPU") hardware, graphics processing unit ("GPU") hardware or other hardware, such as data processing unit ("DPU") hardware, or field programmable gate arrays ("FPGAs").

Figure 8B:
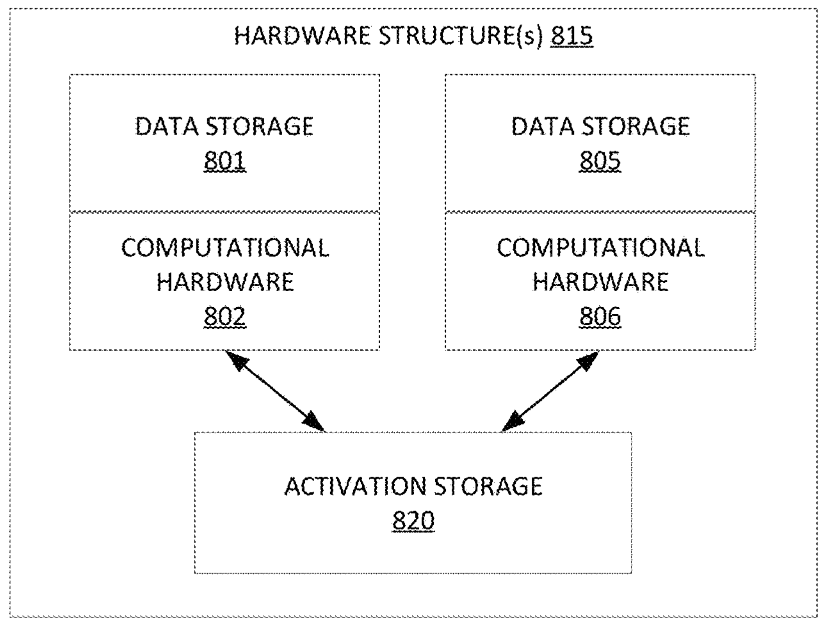
FIG. 8B illustrates inference and/or training logic, according to at least one embodiment.

FIG. 8B illustrates inference and/or training logic 815, according to at least one or more embodiments. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 815 includes, without limitation, code and/or data storage 801 and code and/or data storage 805, which may be used to store code (e.g., graph code), weight values and/or other information, including bias values, gradient information, momentum values, and/or other parameter or hyperparameter information. In at least one embodiment illustrated in FIG. 8B, each of code and/or data storage 801 and code and/or data storage 805 is associated with a dedicated computational resource, such as computational hardware 802 and computational hardware 806, respectively. In at least one embodiment, each of computational hardware 802 and computational hardware 806 comprises one or more ALUs that perform mathematical functions, such as linear algebraic functions, only on information stored in code and/or data storage 801 and code and/or data storage 805, respectively, result of which is stored in activation storage 820.

In at least one embodiment, each of code and/or data storage 801 and 805 and corresponding computational hardware 802 and 806, respectively, correspond to different layers of a neural network, such that resulting activation from one "storage/computational pair 801/802" of code and/or data storage 801 and computational hardware 802 is provided as an input to "storage/computational pair 805/806" of code and/or data storage 805 and computational hardware 806, in order to mirror conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage computation pairs 801/802 and 805/806 may be included in inference and/or training logic 815.

Data Center

Figure 9:
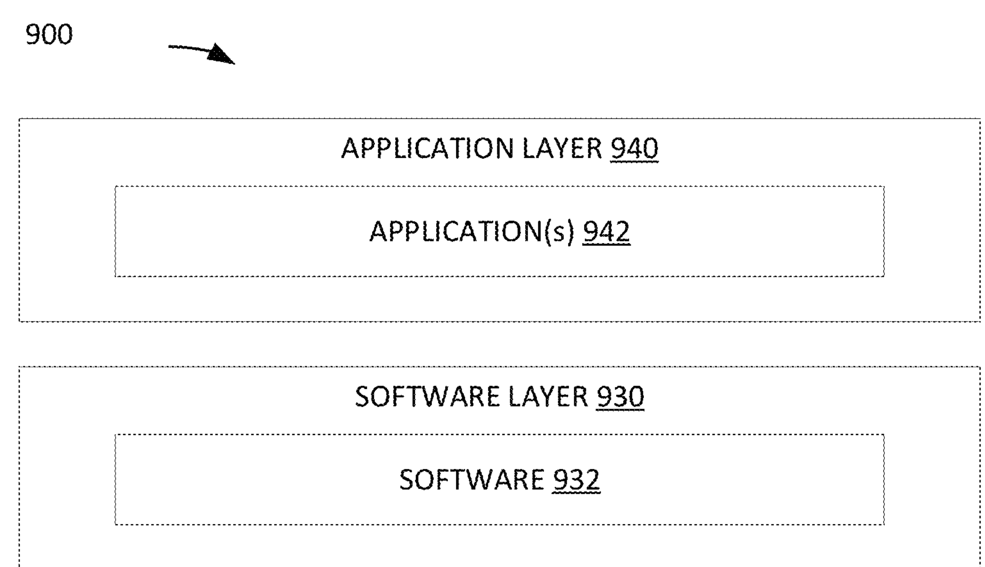
FIG. 9 illustrates an example data center system, according to at least one embodiment.
Figure 9:
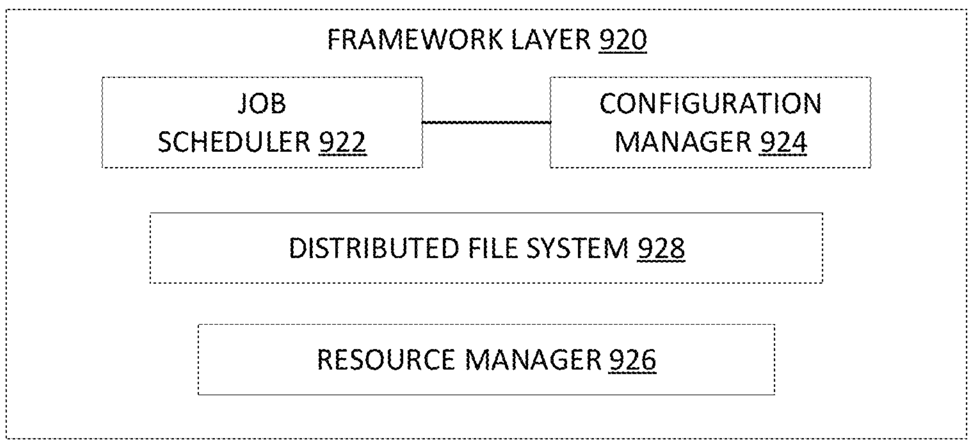
Figure 9:
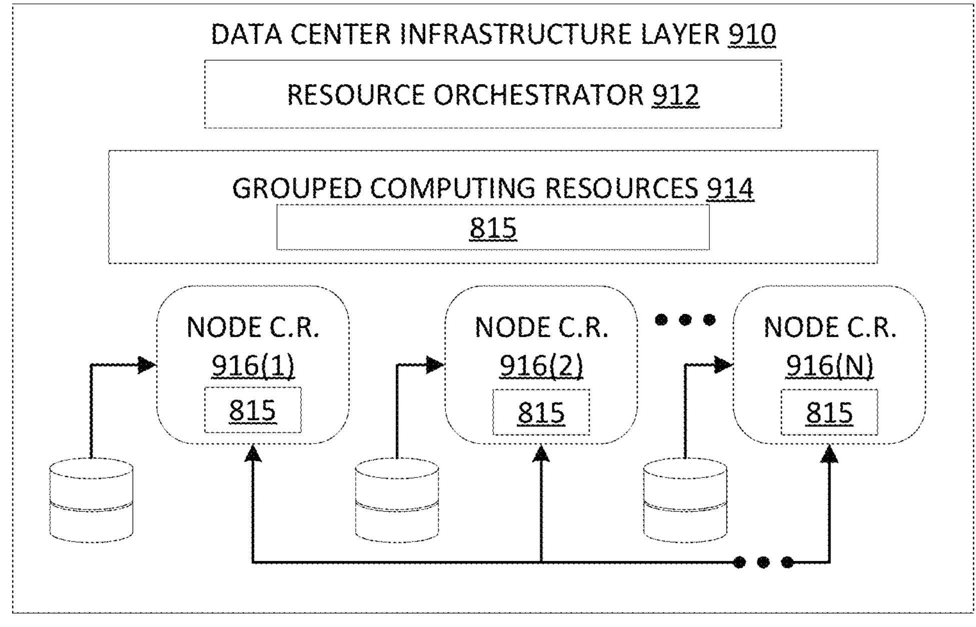

FIG. 9 illustrates an example data center 900, in which at least one embodiment may be used. In at least one embodiment, data center 900 includes a data center infrastructure layer 910, a framework layer 920, a software layer 930, and an application layer 940.

In at least one embodiment, as shown in FIG. 9, data center infrastructure layer 910 may include a resource orchestrator 912, grouped computing resources 914, and node computing resources ("node C.R.s") 916(1)-1016(N), where "N" represents any whole, positive integer. In at least one embodiment, node C.R.s 916(1)-1016(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-1016(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-1016(N) and/or grouped computing resources 914. In at least one embodiment, resource orchestrator 912 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 922, a configuration manager 924, a resource manager 926 and a distributed file system 928. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 928 for large-scale data processing (e.g., "big data"). In at least one embodiment, job scheduler 922 may include a Spark driver to facilitate scheduling of workloads supported by various layers of data center 900. In at least one embodiment, configuration manager 924 may be capable of configuring different layers such as software layer 930 and framework layer 920 including Spark and distributed file system 928 for supporting large-scale data processing. In at least one embodiment, resource manager 926 may be capable of managing clustered or grouped computing resources mapped to or allocated for support of distributed file system 928 and job scheduler 922. In at least one embodiment, clustered or grouped computing resources may include grouped computing resource 914 at data center infrastructure layer 910. In at least one embodiment, resource manager 926 may coordinate with resource orchestrator 912 to manage these mapped or allocated computing resources.

In at least one embodiment, software 932 included in software layer 930 may include software used by at least portions of node C.R.s 916(1)-1016(N), grouped computing resources 914, and/or distributed file system 928 of framework layer 920. The one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-1016(N), grouped computing resources 914, and/or distributed file system 928 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 924, resource manager 926, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 815 are used to perform inferencing and/or training operations associated with one or more embodiments. Details regarding inference and/or training logic 815 are provided below in conjunction with FIGS. 8A and/or 8B. In at least one embodiment, inference and/or training logic 815 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 10:
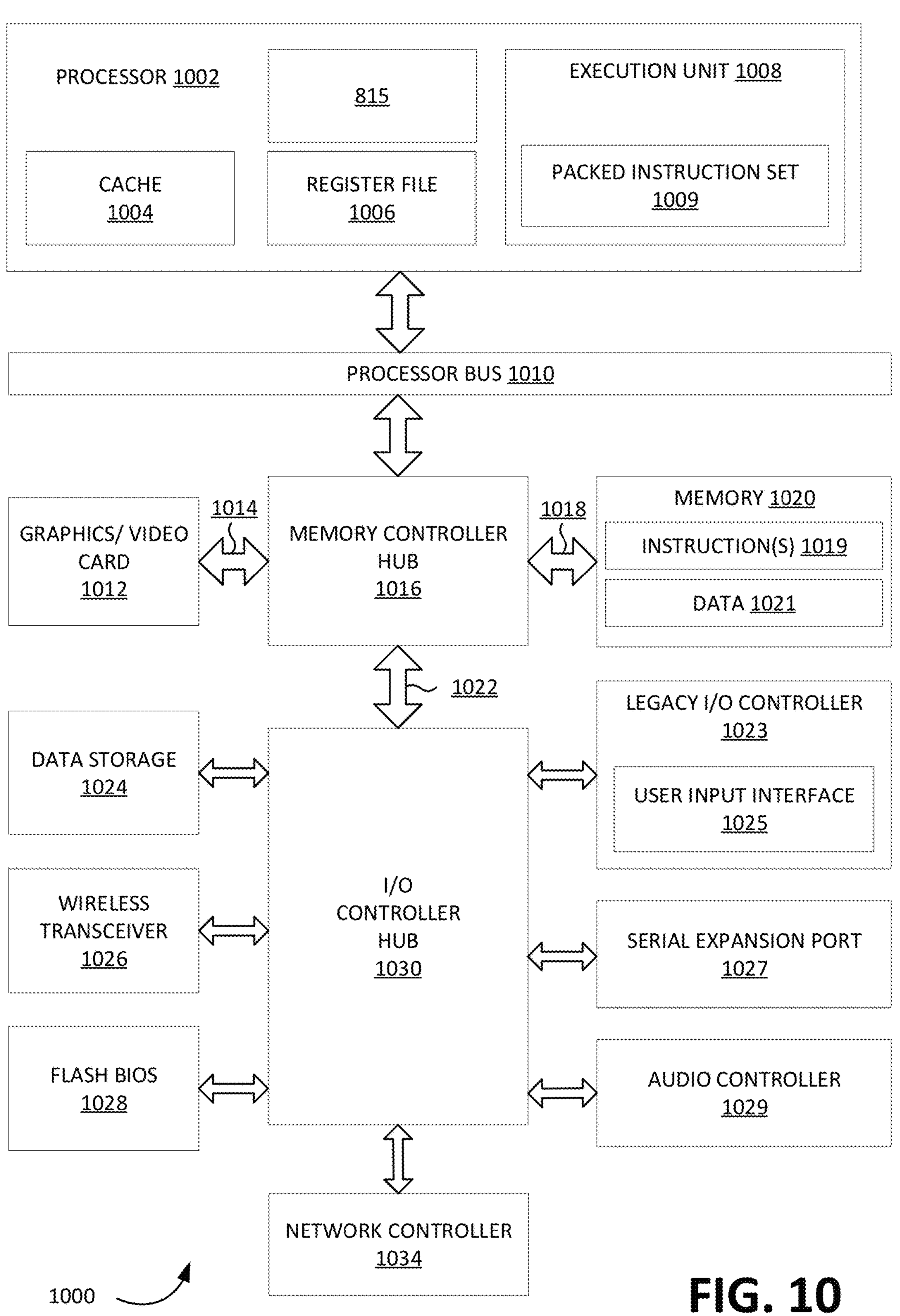
FIG. 10 illustrates a computer system, according to at least one embodiment.

FIG. 10 is a block diagram illustrating an exemplary computer system, which may be a system with interconnected devices and components, a system-on-a-chip (SOC) or some combination thereof 1000 formed with a processor that may include execution units to execute an instruction, according to at least one embodiment. In at least one embodiment, computer system 1000 may include, without limitation, a component, such as a processor 1002 to employ execution units including logic to perform algorithms for process data, in accordance with present disclosure, such as in embodiment described herein. In at least one embodiment, computer system 1000 may include processors, such as PENTIUM® Processor family, Xcon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1000 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IT") devices, or any other system that may perform one or more instructions in accordance with at least one embodiment.

In at least one embodiment, computer system 1000 may include, without limitation, processor 1002 that may include, without limitation, one or more execution units 1008 to perform machine learning model training and/or inferencing according to techniques described herein. In at least one embodiment, computer system 1000 is a single processor desktop or server system, but in another embodiment computer system 1000 may be a multiprocessor system. In at least one embodiment, processor 1002 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1002 may be coupled to a processor bus 1010 that may transmit data signals between processor 1002 and other components in computer system 1000.

In at least one embodiment, processor 1002 may include, without limitation, a Level 1 ("L1") internal cache memory ("cache") 1004. In at least one embodiment, processor 1002 may have a single internal cache or multiple levels of internal cache. In at least one embodiment, cache memory may reside external to processor 1002. Other embodiments may also include a combination of both internal and external caches depending on particular implementation and needs. In at least one embodiment, register file 1006 may store different types of data in various registers including, without limitation, integer registers, floating point registers, status registers, and instruction pointer register.

In at least one embodiment, execution unit 1008, including, without limitation, logic to perform integer and floating point operations, also resides in processor 1002. In at least one embodiment, processor 1002 may also include a microcode ("ucode") read only memory ("ROM") that stores microcode for certain macro instructions. In at least one embodiment, execution unit 1008 may include logic to handle a packed instruction set 1009. In at least one embodiment, by including packed instruction set 1009 in an instruction set of a general-purpose processor 1002, along with associated circuitry to execute instructions, operations used by many multimedia applications may be performed using packed data in a general-purpose processor 1002. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1008 may also be used in microcontrollers, embedded processors, graphics devices, DSPs, and other types of logic circuits. In at least one embodiment, computer system 1000 may include, without limitation, a memory 1020. In at least one embodiment, memory 1020 may be implemented as a Dynamic Random Access Memory ("DRAM") device, a Static Random Access Memory ("SRAM") device, flash memory device, or other memory device. In at least one embodiment, memory 1020 may store instruction(s) 1019 and/or data 1021 represented by data signals that may be executed by processor 1002.

In at least one embodiment, system logic chip may be coupled to processor bus 1010 and memory 1020. In at least one embodiment, system logic chip may include, without limitation, a memory controller hub ("MCH") 1016, and processor 1002 may communicate with MCH 1016 via processor bus 1010. In at least one embodiment, MCH 1016 may provide a high bandwidth memory path 1018 to memory 1020 for instruction and data storage and for storage of graphics commands, data and textures. In at least one embodiment, MCH 1016 may direct data signals between processor 1002, memory 1020, and other components in computer system 1000 and to bridge data signals between processor bus 1010, memory 1020, and a system I/O 1022. In at least one embodiment, system logic chip may provide a graphics port for coupling to a graphics controller. In at least one embodiment, MCH 1016 may be coupled to memory 1020 through a high bandwidth memory path 1018 and graphics/video card 1012 may be coupled to MCH 1016 through an Accelerated Graphics Port ("AGP") interconnect 1014.

In at least one embodiment, computer system 1000 may use system I/O 1022 that is a proprietary hub interface bus to couple MCH 1016 to I/O controller hub ("ICH") 1030. In at least one embodiment, ICH 1030 may provide direct connections to some I/O devices via a local I/O bus. In at least one embodiment, local I/O bus may include, without limitation, a high-speed I/O bus for connecting peripherals to memory 1020, chipset, and processor 1002. Examples may include, without limitation, an audio controller 1029, a firmware hub ("flash BIOS") 1028, a wireless transceiver 1026, a data storage 1024, a legacy I/O controller 1023 containing user input and keyboard interfaces 1025, a serial expansion port 1027, such as Universal Serial Bus ("USB"), and a network controller 1034, which may include in some embodiments, a data processing unit. Data storage 1024 may comprise a hard disk drive, a floppy disk drive, a CD-ROM device, a flash memory device, or other mass storage device.

In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1000 are interconnected using compute express link (CXL) interconnects.

Inference and/or training logic 815 are used to perform inferencing and/or training operations associated with one or more embodiments. Details regarding inference and/or training logic 815 are provided below in conjunction with FIGS. 8A and/or 8B. In at least one embodiment, inference and/or training logic 815 may be used in system FIG. 10 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 11:
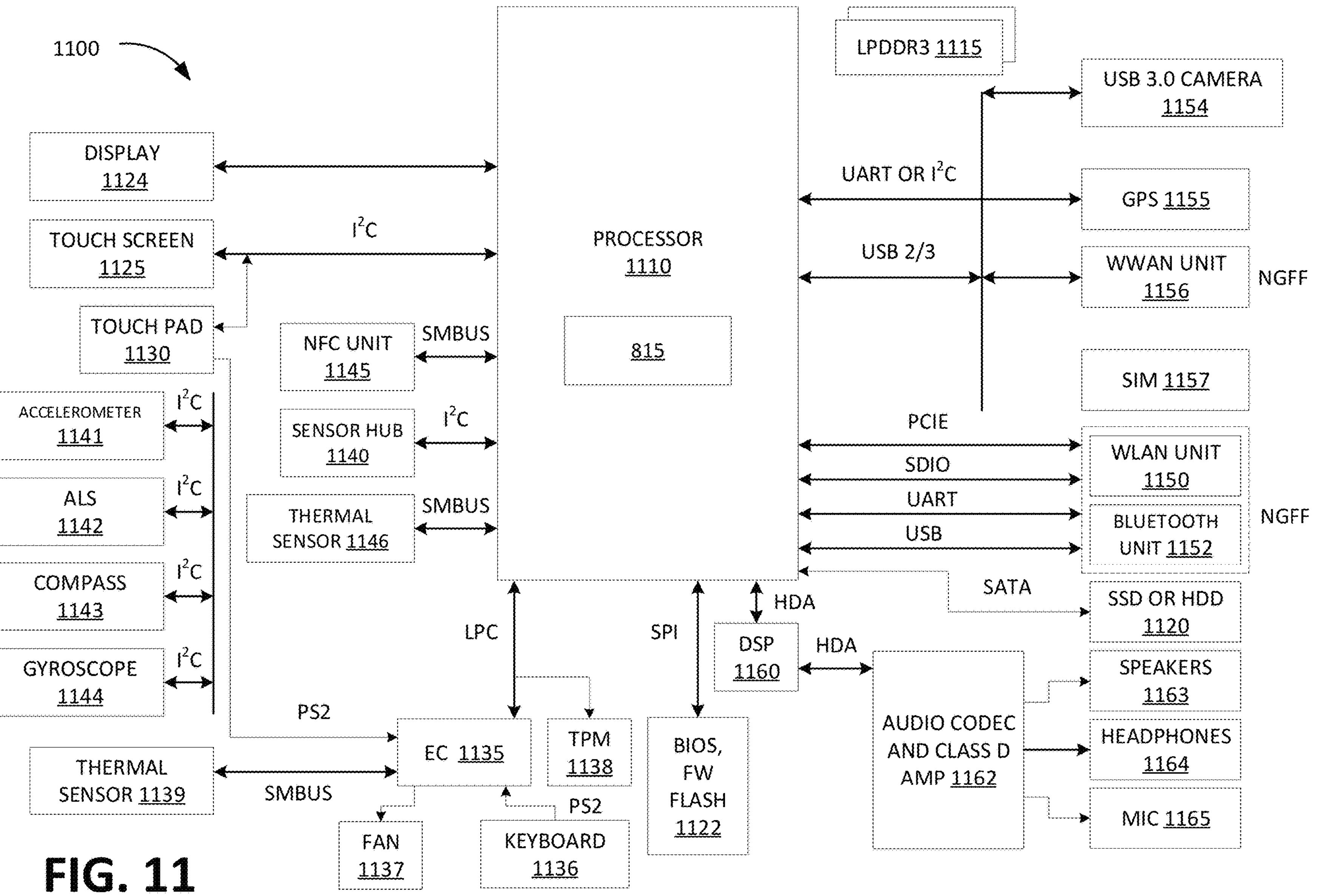
FIG. 11 illustrates a computer system, according to at least one embodiment.

FIG. 11 is a block diagram illustrating an electronic device 1100 for utilizing a processor 1110, according to at least one embodiment. In at least one embodiment, electronic device 1100 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1100 may include, without limitation, processor 1110 communicatively coupled to any suitable number or kind of components, peripherals, modules, or devices. In at least one embodiment, processor 1110 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 11 illustrates a system, which includes interconnected hardware devices or "chips", whereas in other embodiments, FIG. 11 may illustrate an exemplary System on a Chip ("SoC"). In at least one embodiment, devices illustrated in FIG. 11 may be interconnected with proprietary interconnects, standardized interconnects (e.g., PCIe) or some combination thereof. In at least one embodiment, one or more components of FIG. 11 are interconnected using compute express link (CXL) interconnects.

In at least one embodiment, FIG. 11 may include a display 1124, a touch screen 1125, a touch pad 1130, a Near Field Communications unit ("NFC") 1145, a sensor hub 1140, a thermal sensor 1146, an Express Chipset ("EC") 1135, a Trusted Platform Module ("TPM") 1138, BIOS/firmware/flash memory ("BIOS, FW Flash") 1122, a DSP 1160, a drive 1120 such as a Solid State Disk ("SSD") or a Hard Disk Drive ("HDD"), a wireless local area network unit ("WLAN") 1150, a Bluetooth unit 1152, a Wireless Wide Area Network unit ("WWAN") 1156, a Global Positioning System (GPS) 1155, a camera ("USB 3.0 camera") 1154 such as a USB 3.0 camera, and/or a Low Power Double Data Rate ("LPDDR") memory unit ("LPDDR3") 1115 implemented in, for example, LPDDR3 standard. These components may each be implemented in any suitable manner.

In at least one embodiment, other components may be communicatively coupled to processor 1110 through components discussed above. In at least one embodiment, an accelerometer 1141, Ambient Light Sensor ("ALS") 1142, compass 1143, and a gyroscope 1144 may be communicatively coupled to sensor hub 1140. In at least one embodiment, thermal sensor 1139, a fan 1137, a keyboard 1136, and a touch pad 1130 may be communicatively coupled to EC 1135. In at least one embodiment, speaker 1163, headphones 1164, and microphone ("mic") 1165 may be communicatively coupled to an audio unit ("audio codec and class d amp") 1162, which may in turn be communicatively coupled to DSP 1160. In at least one embodiment, audio unit 1164 may include, for example and without limitation, an audio coder/decoder ("codec") and a class D amplifier. In at least one embodiment, SIM card ("SIM") 1157 may be communicatively coupled to WWAN unit 1156. In at least one embodiment, components such as WLAN unit 1150 and Bluetooth unit 1152, as well as WWAN unit 1156 may be implemented in a Next Generation Form Factor ("NGFF").

Inference and/or training logic 815 are used to perform inferencing and/or training operations associated with one or more embodiments. Details regarding inference and/or training logic 815 are provided below in conjunction with FIGS. 8A and/or 8B. In at least one embodiment, inference and/or training logic 815 may be used in system FIG. 11 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 12:
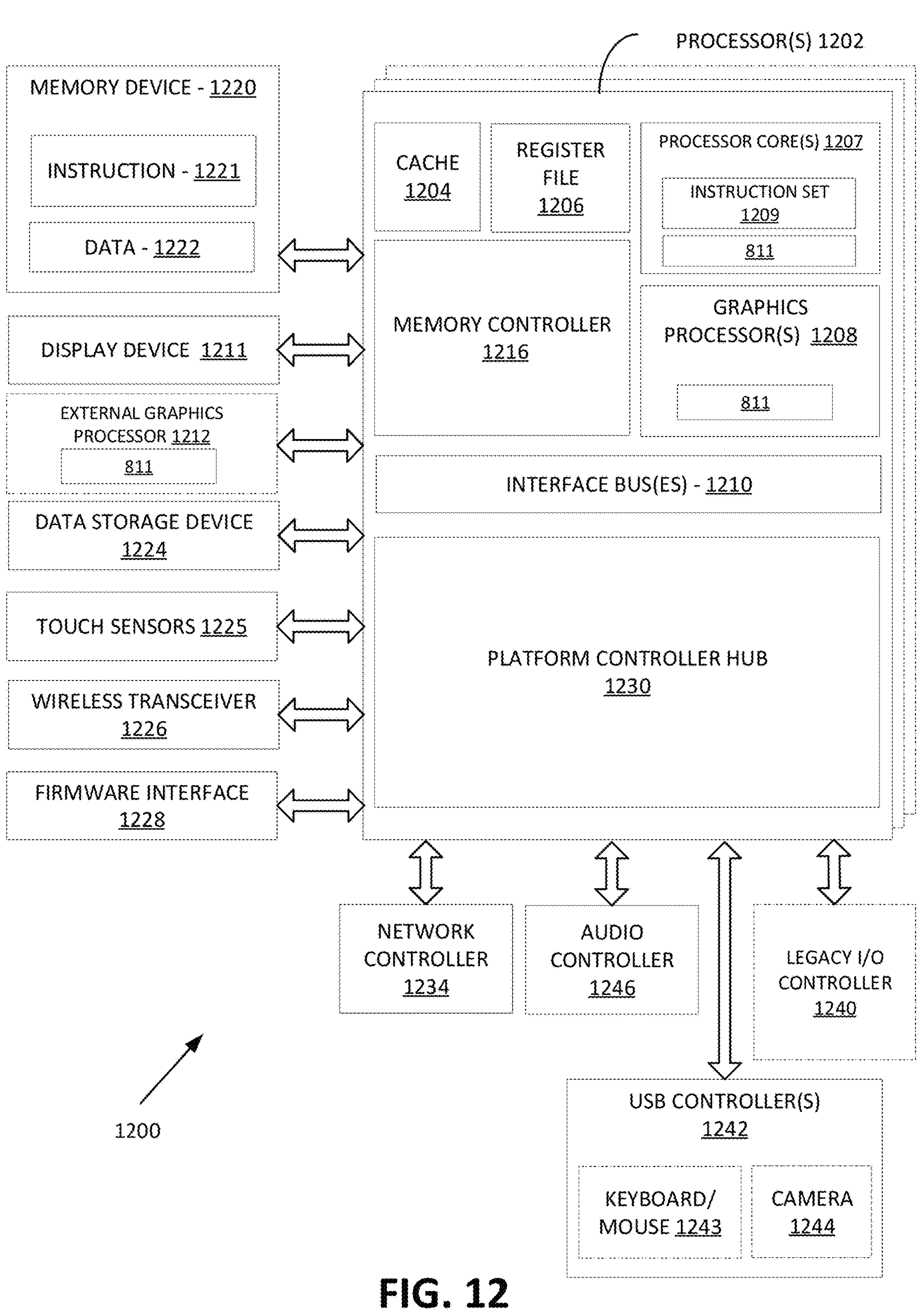
FIG. 12 illustrates at least portions of a graphics processor, according to one or more embodiments.

FIG. 12 is a block diagram of a processing system, according to at least one embodiment. In at least one embodiment, system 1200 includes one or more processors 1202 and one or more graphics processors 1208, and may be a single processor desktop system, a multiprocessor workstation system, or a server system having a large number of processors 1202 or processor cores 1207. In at least one embodiment, system 1200 is a processing platform incorporated within a system-on-a-chip (SoC) integrated circuit for use in mobile, handheld, edge, or embedded devices.

In at least one embodiment, system 1200 may include, or be incorporated within a server-based gaming platform, a game console, including a game and media console, a mobile gaming console, a handheld game console, or an online game console. In at least one embodiment, system 1200 is a mobile phone, smart phone, tablet computing device or mobile Internet device. In at least one embodiment, processing system 1200 may also include, couple with, or be integrated within a wearable device, such as a smart watch wearable device, smart eyewear device, augmented reality device, or virtual reality device. In at least one embodiment, processing system 1200 is a television or set top box device having one or more processors 1202 and a graphical interface generated by one or more graphics processors 1208.

In at least one embodiment, one or more processors 1202 each include one or more processor cores 1207 to process instructions which, when executed, perform operations for system and user software. In at least one embodiment, each of one or more processor cores 1207 is configured to process a specific instruction set 1209. In at least one embodiment, instruction set 1209 may facilitate Complex Instruction Set Computing (CISC), Reduced Instruction Set Computing (RISC), or computing via a Very Long Instruction Word (VLIW). In at least one embodiment, processor cores 1207 may each process a different instruction set 1209, which may include instructions to facilitate emulation of other instruction sets. In at least one embodiment, processor core 1207 may also include other processing devices, such a Digital Signal Processor (DSP).

In at least one embodiment, processor 1202 includes cache memory 1204. In at least one embodiment, processor 1202 may have a single internal cache or multiple levels of internal cache. In at least one embodiment, cache memory is shared among various components of processor 1202. In at least one embodiment, processor 1202 also uses an external cache (e.g., a Level-3 (L3) cache or Last Level Cache (LLC)) (not shown), which may be shared among processor cores 1207 using known cache coherency techniques. In at least one embodiment, register file 1206 is additionally included in processor 1202 which may include different types of registers for storing different types of data (e.g., integer registers, floating point registers, status registers, and an instruction pointer register). In at least one embodiment, register file 1206 may include general-purpose registers or other registers.

In at least one embodiment, one or more processor(s) 1202 are coupled with one or more interface bus(es) 1210 to transmit communication signals such as address, data, or control signals between processor 1202 and other components in system 1200. In at least one embodiment, interface bus 1210, in one embodiment, may be a processor bus, such as a version of a Direct Media Interface (DMI) bus. In at least one embodiment, interface 1210 is not limited to a DMI bus, and may include one or more Peripheral Component Interconnect buses (e.g., PCI, PCI Express), memory busses, or other types of interface busses. In at least one embodiment processor(s) 1202 include an integrated memory controller 1216 and a platform controller hub 1230. In at least one embodiment, memory controller 1216 facilitates communication between a memory device and other components of system 1200, while platform controller hub (PCH) 1230 provides connections to I/O devices via a local I/O bus.

In at least one embodiment, memory device 1220 may be a dynamic random access memory (DRAM) device, a static random access memory (SRAM) device, flash memory device, phase-change memory device, or some other memory device having suitable performance to serve as process memory. In at least one embodiment memory device 1220 may operate as system memory for system 1200, to store data 1222 and instructions 1221 for use when one or more processors 1202 executes an application or process. In at least one embodiment, memory controller 1216 also couples with an optional external graphics processor 1212, which may communicate with one or more graphics processors 1208 in processors 1202 to perform graphics and media operations. In at least one embodiment, a display device 1211 may connect to processor(s) 1202. In at least one embodiment display device 1211 may include one or more of an internal display device, as in a mobile electronic device or a laptop device or an external display device attached via a display interface (e.g., DisplayPort, etc.). In at least one embodiment, display device 1211 may include a head mounted display (HMD) such as a stereoscopic display device for use in virtual reality (VR) applications or augmented reality (AR) applications.

In at least one embodiment, platform controller hub 1230 enables peripherals to connect to memory device 1220 and processor 1202 via a high-speed I/O bus. In at least one embodiment, I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). In at least one embodiment, data storage device 1224 may connect via a storage interface (e.g., SATA) or via a peripheral bus, such as a Peripheral Component Interconnect bus (e.g., PCI, PCI Express). In at least one embodiment, touch sensors 1225 may include touch screen sensors, pressure sensors, or fingerprint sensors. In at least one embodiment, wireless transceiver 1226 may be a Wi-Fi transceiver, a Bluetooth transceiver, or a mobile network transceiver such as a 3G, 4G, or Long Term Evolution (LTE) transceiver. In at least one embodiment, firmware interface 1228 enables communication with system firmware, and may be, for example, a unified extensible firmware interface (UEFI). In at least one embodiment, network controller 1234 may enable a network connection to a wired network. In at least one embodiment, a high-performance network controller (not shown) couples with interface bus 1210. In at least one embodiment, audio controller 1246 is a multi-channel high definition audio controller. In at least one embodiment, system 1200 includes an optional legacy I/O controller 1240 for coupling legacy (e.g., Personal System 2 (PS/2)) devices to system. In at least one embodiment, platform controller hub 1230 may also connect to one or more Universal Serial Bus (USB) controllers 1242 connect input devices, such as keyboard and mouse 1243 combinations, a camera 1244, or other USB input devices.

In at least one embodiment, an instance of memory controller 1216 and platform controller hub 1230 may be integrated into a discreet external graphics processor, such as external graphics processor 1212. In at least one embodiment, platform controller hub 1230 and/or memory controller 1216 may be external to one or more processor(s) 1202. For example, in at least one embodiment, system 1200 may include an external memory controller 1216 and platform controller hub 1230, which may be configured as a memory controller hub and peripheral controller hub within a system chipset that is in communication with processor(s) 1202.

Inference and/or training logic 815 are used to perform inferencing and/or training operations associated with one or more embodiments. Details regarding inference and/or training logic 815 are provided below in conjunction with FIGS. 8A and/or 8B. In at least one embodiment portions or all of inference and/or training logic 815 may be incorporated into graphics processor 1300. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 13:
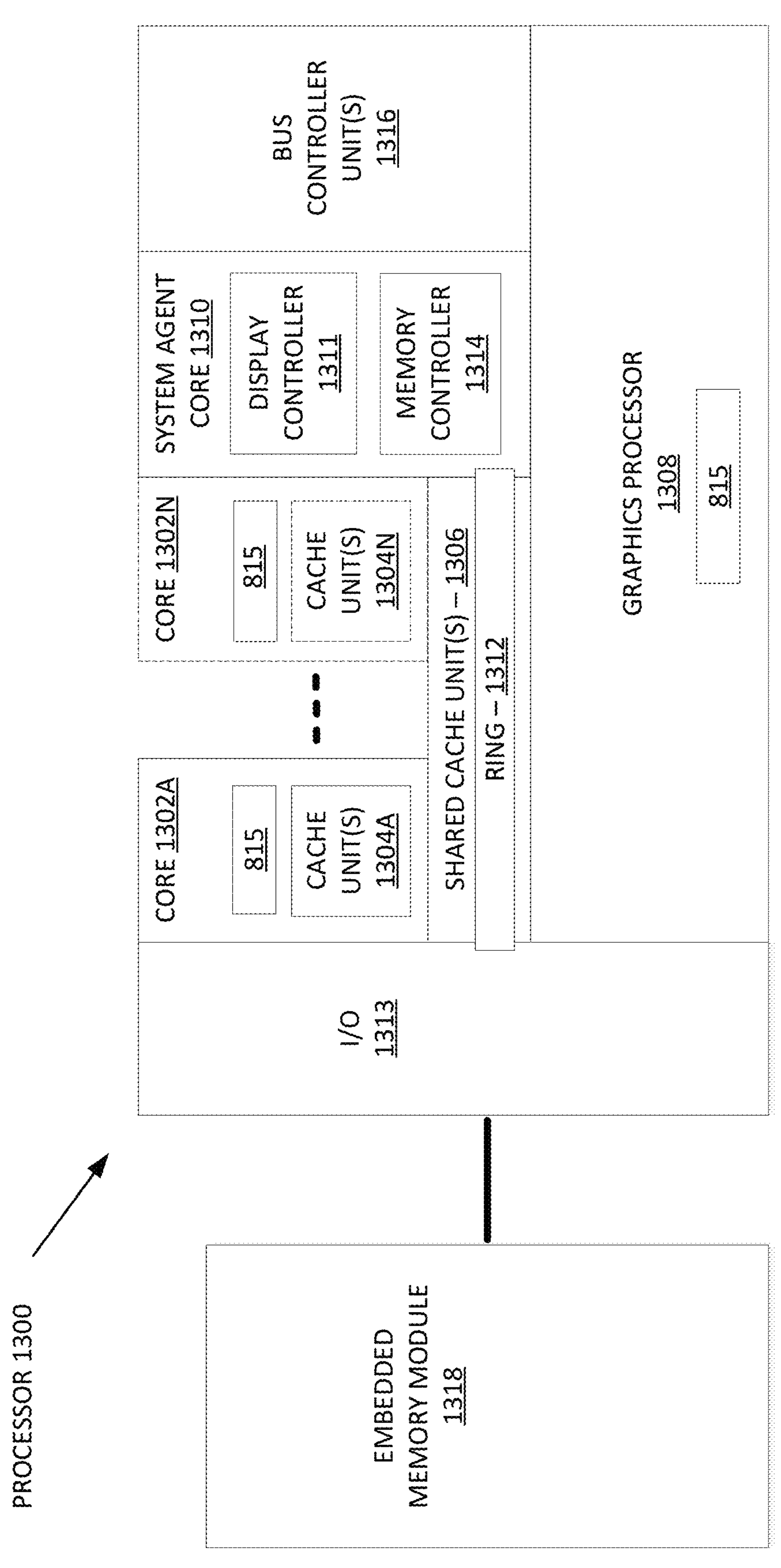
FIG. 13 illustrates at least portions of a graphics processor, according to one or more embodiments.

FIG. 13 is a block diagram of a processor 1300 having one or more processor cores 1302A-1402N, an integrated memory controller 1314, and an integrated graphics processor 1308, according to at least one embodiment. In at least one embodiment, processor 1300 may include additional cores up to and including additional core 1302N represented by dashed lined boxes. In at least one embodiment, each of processor cores 1302A-1402N includes one or more internal cache units 1304A-1404N. In at least one embodiment, each processor core also has access to one or more shared cached units 1306.

In at least one embodiment, internal cache units 1304A-1404N and shared cache units 1306 represent a cache memory hierarchy within processor 1300. In at least one embodiment, cache memory units 1304A-1404N may include at least one level of instruction and data cache within each processor core and one or more levels of shared mid-level cache, such as a Level 2 (L2), Level 3 (L3), Level 4 (LA), or other levels of cache, where a highest level of cache before external memory is classified as an LLC. In at least one embodiment, cache coherency logic maintains coherency between various cache units 1306 and 1304A-1404N.

In at least one embodiment, processor 1300 may also include a set of one or more bus controller units 1316 and a system agent core 1310. In at least one embodiment, one or more bus controller units 1316 manage a set of peripheral buses, such as one or more PCI or PCI express busses. In at least one embodiment, system agent core 1310 provides management functionality for various processor components. In at least one embodiment, system agent core 1310 includes one or more integrated memory controllers 1314 to manage access to various external memory devices (not shown).

In at least one embodiment, one or more of processor cores 1302A-1402N include support for simultaneous multi-threading. In at least one embodiment, system agent core 1310 includes components for coordinating and operating cores 1302A-1402N during multi-threaded processing. In at least one embodiment, system agent core 1310 may additionally include a power control unit (PCU), which includes logic and components to regulate one or more power states of processor cores 1302A-1402N and graphics processor 1308.

In at least one embodiment, processor 1300 additionally includes graphics processor 1308 to execute graphics processing operations. In at least one embodiment, graphics processor 1308 couples with shared cache units 1306, and system agent core 1310, including one or more integrated memory controllers 1314. In at least one embodiment, system agent core 1310 also includes a display controller 1311 to drive graphics processor output to one or more coupled displays. In at least one embodiment, display controller 1311 may also be a separate module coupled with graphics processor 1308 via at least one interconnect, or may be integrated within graphics processor 1308.

In at least one embodiment, a ring based interconnect unit 1312 is used to couple internal components of processor 1300. In at least one embodiment, an alternative interconnect unit may be used, such as a point-to-point interconnect, a switched interconnect, or other techniques. In at least one embodiment, graphics processor 1308 couples with ring interconnect 1312 via an I/O link 1313.

In at least one embodiment, I/O link 1313 represents at least one of multiple varieties of I/O interconnects, including an on package I/O interconnect which facilitates communication between various processor components and a high-performance embedded memory module 1318, such as an eDRAM module. In at least one embodiment, each of processor cores 1302A-1402N and graphics processor 1308 use embedded memory modules 1318 as a shared Last Level Cache.

In at least one embodiment, processor cores 1302A-1402N are homogenous cores executing a common instruction set architecture. In at least one embodiment, processor cores 1302A-1402N are heterogeneous in terms of instruction set architecture (ISA), where one or more of processor cores 1302A-1402N execute a common instruction set, while one or more other cores of processor cores 1302A-1402N executes a subset of a common instruction set or a different instruction set. In at least one embodiment, processor cores 1302A-1402N are heterogeneous in terms of microarchitecture, where one or more cores having a relatively higher power consumption couple with one or more power cores having a lower power consumption. In at least one embodiment, processor 1300 may be implemented on one or more chips or as an SoC integrated circuit.

Inference and/or training logic 815 are used to perform inferencing and/or training operations associated with one or more embodiments. Details regarding inference and/or training logic 815 are provided below in conjunction with FIGS. 8A and/or 8B. In at least one embodiment portions or all of inference and/or training logic 815 may be incorporated into processor 1300. For example, in at least one embodiment, training and/or inferencing techniques described herein may use one or more of ALUs embodied in graphics processor 1308, graphics core(s) 1302A-1402N, or other components in FIG. 13. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of graphics processor 1300 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 14:
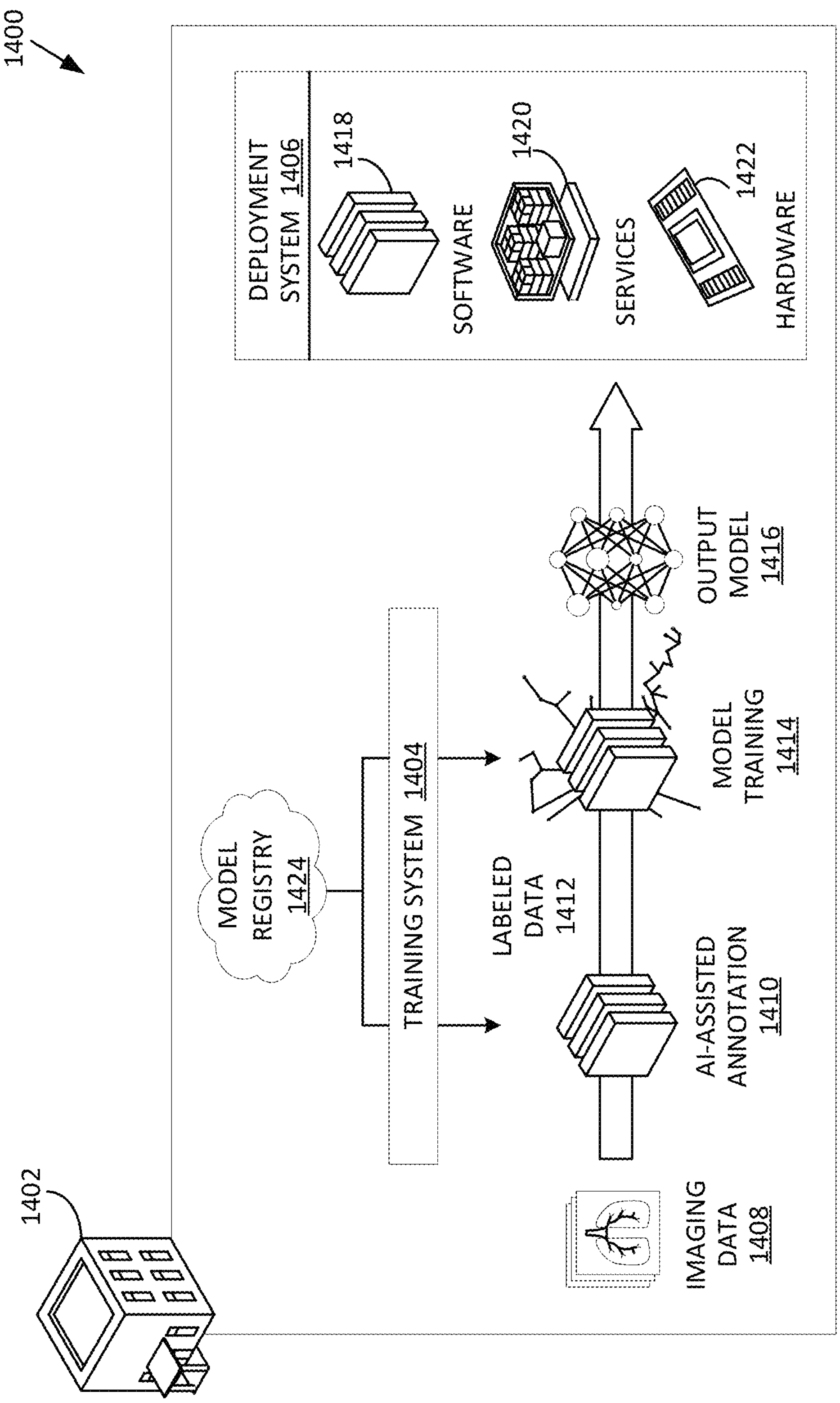
FIG. 14 is an example data flow diagram for an advanced computing pipeline, in accordance with at least one embodiment.

FIG. 14 is an example data flow diagram for a process 1400 of generating and deploying an image processing and inferencing pipeline, in accordance with at least one embodiment. In at least one embodiment, process 1400 may be deployed for use with imaging devices, processing devices, and/or other device types at one or more facilities 1402. Process 1400 may be executed within a training system 1404 and/or a deployment system 1406. In at least one embodiment, training system 1404 may be used to perform training, deployment, and implementation of machine learning models (e.g., neural networks, object detection algorithms, computer vision algorithms, etc.) for use in deployment system 1406. In at least one embodiment, deployment system 1406 may be configured to offload processing and compute resources among a distributed computing environment to reduce infrastructure requirements at facility 1402. In at least one embodiment, one or more applications in a pipeline may use or call upon services (e.g., inference, visualization, compute, AI, etc.) of deployment system 1406 during execution of applications.

In at least one embodiment, some of applications used in advanced processing and inferencing pipelines may use machine learning models or other AI to perform one or more processing steps. In at least one embodiment, machine learning models may be trained at facility 1402 using data 1408 (such as imaging data) generated at facility 1402 (and stored on one or more picture archiving and communication system (PACS) servers at facility 1402), may be trained using imaging or sequencing data 1408 from another facility (ies), or a combination thereof. In at least one embodiment, training system 1404 may be used to provide applications, services, and/or other resources for generating working, deployable machine learning models for deployment system 1406.

In at least one embodiment, model registry 1424 may be backed by object storage that may support versioning and object metadata. In at least one embodiment, object storage may be accessible through, for example, a cloud storage (e.g., cloud 1526 of FIG. 15) compatible application programming interface (API) from within a cloud platform. In at least one embodiment, machine learning models within model registry 1424 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1504 (FIG. 15) may include a scenario where facility 1402 is training their own machine learning model, or has an existing machine learning model that needs to be optimized or updated. In at least one embodiment, imaging data 1408 generated by imaging device(s), sequencing devices, and/or other device types may be received. In at least one embodiment, once imaging data 1408 is received, AI-assisted annotation 1410 may be used to aid in generating annotations corresponding to imaging data 1408 to be used as ground truth data for a machine learning model. In at least one embodiment, AI-assisted annotation 1410 may include one or more machine learning models (e.g., convolutional neural networks (CNNs)) that may be trained to generate annotations corresponding to certain types of imaging data 1408 (e.g., from certain devices). In at least one embodiment, AI-assisted annotations 1410 may then be used directly, or may be adjusted or fine-tuned using an annotation tool to generate ground truth data. In at least one embodiment, AI-assisted annotations 1410, labeled clinic data 1412, or a combination thereof may be used as ground truth data for training a machine learning model. In at least one embodiment, a trained machine learning model may be referred to as output model 1416, and may be used by deployment system 1406, as described herein.

In at least one embodiment, training pipeline 1504 (FIG. 15) may include a scenario where facility 1402 needs a machine learning model for use in performing one or more processing tasks for one or more applications in deployment system 1406, but facility 1402 may not currently have such a machine learning model (or may not have a model that is optimized, efficient, or effective for such purposes). In at least one embodiment, an existing machine learning model may be selected from a model registry 1424. In at least one embodiment, model registry 1424 may include machine learning models trained to perform a variety of different inference tasks on imaging data. In at least one embodiment, machine learning models in model registry 1424 may have been trained on imaging data from different facilities than facility 1402 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1424. In at least one embodiment, a machine learning model may then be retrained, or updated, at any number of other facilities, and a retrained or updated model may be made available in model registry 1424. In at least one embodiment, a machine learning model may then be selected from model registry 1424—and referred to as output model 1416—and may be used in deployment system 1406 to perform one or more processing tasks for one or more applications of a deployment system.

In at least one embodiment, training pipeline 1504 (FIG. 15), a scenario may include facility 1402 requiring a machine learning model for use in performing one or more processing tasks for one or more applications in deployment system 1406, but facility 1402 may not currently have such a machine learning model (or may not have a model that is optimized, efficient, or effective for such purposes). In at least one embodiment, a machine learning model selected from model registry 1424 may not be fine-tuned or optimized for imaging data 1408 generated at facility 1402 because of differences in populations, robustness of training data used to train a machine learning model, diversity in anomalies of training data, and/or other issues with training data. In at least one embodiment, AI-assisted annotation 1410 may be used to aid in generating annotations corresponding to imaging data 1408 to be used as ground truth data for retraining or updating a machine learning model. In at least one embodiment, labeled data 1412 may be used as ground truth data for training a machine learning model. In at least one embodiment, retraining or updating a machine learning model may be referred to as model training 1414. In at least one embodiment, model training 1414—e.g., AI-assisted annotations 1410, labeled clinic data 1412, or a combination thereof—may be used as ground truth data for retraining or updating a machine learning model. In at least one embodiment, a trained machine learning model may be referred to as output model 1416, and may be used by deployment system 1406, as described herein.

In at least one embodiment, deployment system 1406 may include software 1418, services 1420, hardware 1422, and/or other components, features, and functionality. In at least one embodiment, deployment system 1406 may include a software "stack," such that software 1418 may be built on top of services 1420 and may use services 1420 to perform some or all of processing tasks, and services 1420 and software 1418 may be built on top of hardware 1422 and use hardware 1422 to execute processing, storage, and/or other compute tasks of deployment system 1406. In at least one embodiment, software 1418 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1408, in addition to containers that receive and configure imaging data for use by each container and/or for use by facility 1402 after processing through a pipeline (e.g., to convert outputs back to a usable data type). In at least one embodiment, a combination of containers within software 1418 (e.g., that make up a pipeline) may be referred to as a virtual instrument (as described in more detail herein), and a virtual instrument may leverage services 1420 and hardware 1422 to execute some or all processing tasks of applications instantiated in containers.

In at least one embodiment, a data processing pipeline may receive input data (e.g., imaging data 1408) in a specific format in response to an inference request (e.g., a request from a user of deployment system 1406). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1416 of training system 1404.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1424 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1420 as a system (e.g., system 1500 of FIG. 15). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1500 (e.g., for accuracy), an application may be available in a container registry for selection and/or implementation by a user to perform one or more processing tasks with respect to data at a facility (e.g., a second facility) of a user.

Figure 15:
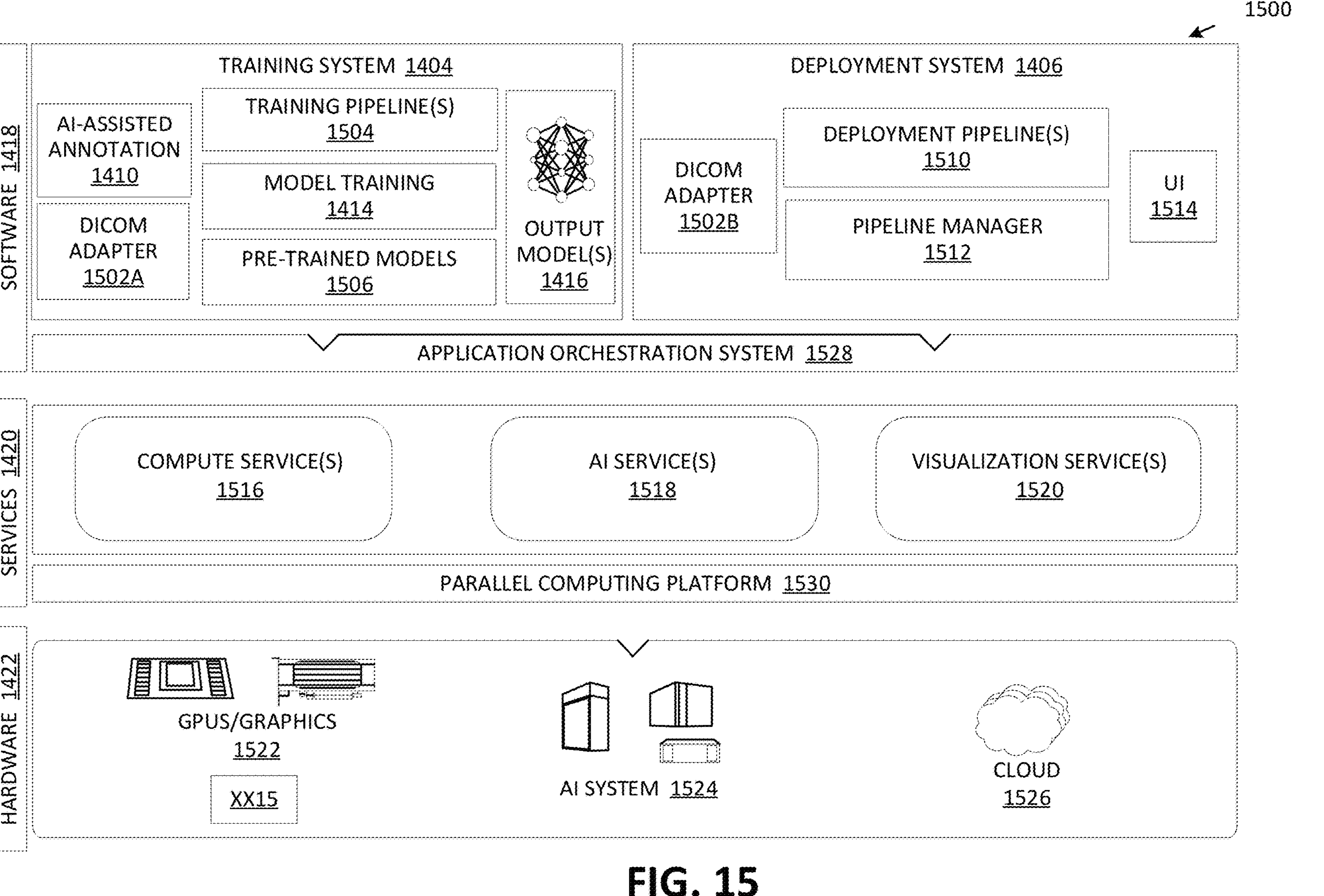
FIG. 15 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1500 of FIG. 15). In at least one embodiment, completed and validated applications or containers may be stored in a container registry and associated machine learning models may be stored in model registry 1424. In at least one embodiment, a requesting entity—who provides an inference or image processing request—may browse a container registry and/or model registry 1424 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1406 (e.g., a cloud) to perform processing of data processing pipeline. In at least one embodiment, processing by deployment system 1406 may include referencing selected elements (e.g., applications, containers, models, etc.) from a container registry and/or model registry 1424. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1420 may be leveraged. In at least one embodiment, services 1420 may include compute services, artificial intelligence (AI) services, visualization services, and/or other service types. In at least one embodiment, services 1420 may provide functionality that is common to one or more applications in software 1418, so functionality may be abstracted to a service that may be called upon or leveraged by applications. In at least one embodiment, functionality provided by services 1420 may run dynamically and more efficiently, while also scaling well by allowing applications to process data in parallel (e.g., using a parallel computing platform 1530 (FIG. 15)). In at least one embodiment, rather than each application that shares a same functionality offered by a service 1420 being required to have a respective instance of service 1420, service 1420 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1420 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1418 implementing advanced processing and inferencing pipeline that includes segmentation application and anomaly detection application may be streamlined because each application may call upon a same inference service to perform one or more inferencing tasks.

In at least one embodiment, hardware 1422 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1422 may be used to provide efficient, purpose-built support for software 1418 and services 1420 in deployment system 1406. In at least one embodiment, use of GPU processing may be implemented for processing locally (e.g., at facility 1402), within an AI/deep learning system, in a cloud system, and/or in other processing components of deployment system 1406 to improve efficiency, accuracy, and efficacy of image processing and generation. In at least one embodiment, software 1418 and/or services 1420 may be optimized for GPU processing with respect to deep learning, machine learning, and/or high-performance computing, as non-limiting examples. In at least one embodiment, at least some of computing environment of deployment system 1406 and/or training system 1404 may be executed in a datacenter one or more supercomputers or high performance computing systems, with GPU optimized software (e.g., hardware and software combination of NVIDIA's DGX System). In at least one embodiment, hardware 1422 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 15 is a system diagram for an example system 1500 for generating and deploying an imaging deployment pipeline, in accordance with at least one embodiment. In at least one embodiment, system 1500 may be used to implement process 1400 of FIG. 14 and/or other processes including advanced processing and inferencing pipelines. In at least one embodiment, system 1500 may include training system 1404 and deployment system 1406. In at least one embodiment, training system 1404 and deployment system 1406 may be implemented using software 1418, services 1420, and/or hardware 1422, as described herein.

In at least one embodiment, system 1500 (e.g., training system 1404 and/or deployment system 1406) may implemented in a cloud computing environment (e.g., using cloud 1526). In at least one embodiment, system 1500 may be implemented locally with respect to a healthcare services facility, or as a combination of both cloud and local computing resources. In at least one embodiment, access to APIs in cloud 1526 may be restricted to authorized users through enacted security measures or protocols. In at least one embodiment, a security protocol may include web tokens that may be signed by an authentication (e.g., AuthN, AuthZ, Gluccon, etc.) service and may carry appropriate authorization. In at least one embodiment, APIs of virtual instruments (described herein), or other instantiations of system 1500, may be restricted to a set of public IPs that have been vetted or authorized for interaction.

In at least one embodiment, various components of system 1500 may communicate between and among one another using any of a variety of different network types, including but not limited to local area networks (LANs) and/or wide area networks (WANs) via wired and/or wireless communication protocols. In at least one embodiment, communication between facilities and components of system 1500 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1404 may execute training pipelines 1504, similar to those described herein with respect to FIG. 14. In at least one embodiment, where one or more machine learning models are to be used in deployment pipelines 1510 by deployment system 1406, training pipelines 1504 may be used to train or retrain one or more (e.g. pre-trained) models, and/or implement one or more of pre-trained models 1506 (e.g., without a need for retraining or updating). In at least one embodiment, as a result of training pipelines 1504, output model(s) 1416 may be generated. In at least one embodiment, training pipelines 1504 may include any number of processing steps, such as but not limited to imaging data (or other input data) conversion or adaption In at least one embodiment, for different machine learning models used by deployment system 1406, different training pipelines 1504 may be used. In at least one embodiment, training pipeline 1504 similar to a first example described with respect to FIG. 14 may be used for a first machine learning model, training pipeline 1504 similar to a second example described with respect to FIG. 14 may be used for a second machine learning model, and training pipeline 1504 similar to a third example described with respect to FIG. 14 may be used for a third machine learning model. In at least one embodiment, any combination of tasks within training system 1404 may be used depending on what is required for each respective machine learning model. In at least one embodiment, one or more of machine learning models may already be trained and ready for deployment so machine learning models may not undergo any processing by training system 1404, and may be implemented by deployment system 1406.

In at least one embodiment, output model(s) 1416 and/or pre-trained model(s) 1506 may include any types of machine learning models depending on implementation or embodiment. In at least one embodiment, and without limitation, machine learning models used by system 1500 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 16A:
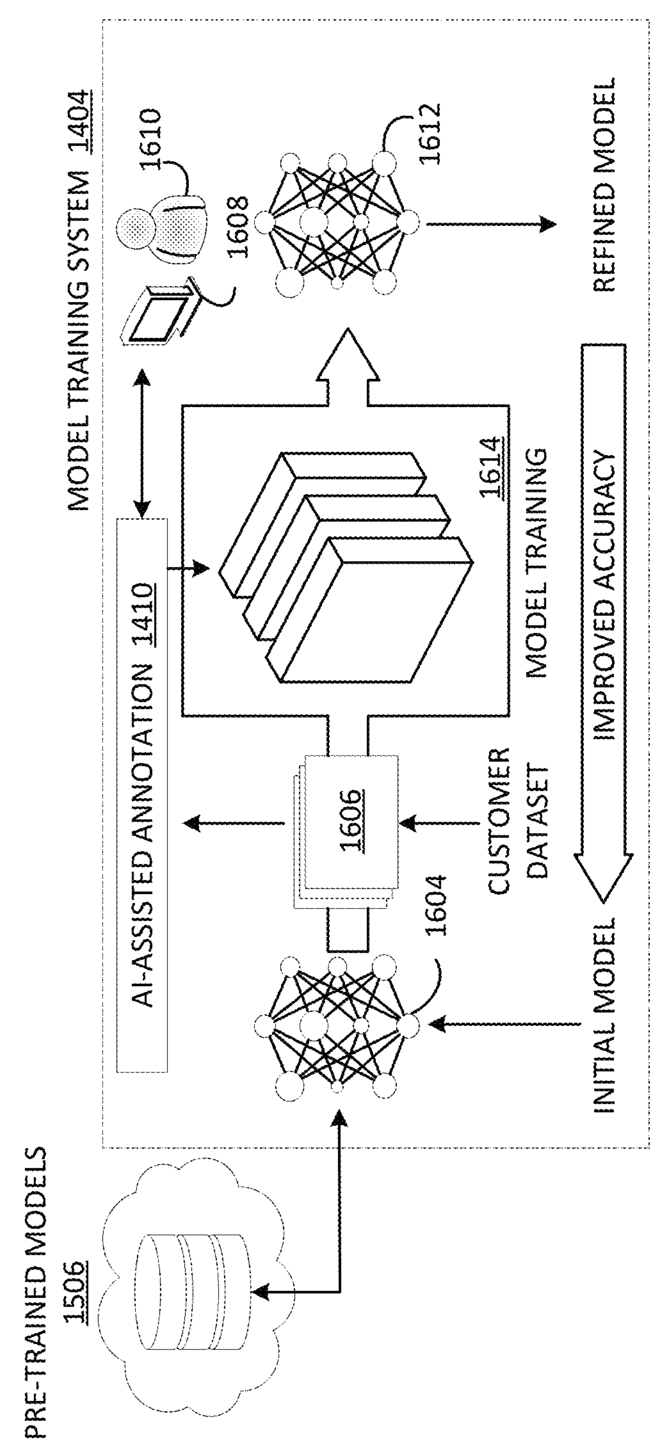
FIGS. 16A and 16B illustrate a data flow diagram for a process to train a machine learning model, as well as client-server architecture to enhance annotation tools with pre-trained annotation models, in accordance with at least one embodiment.
Figure 16B:
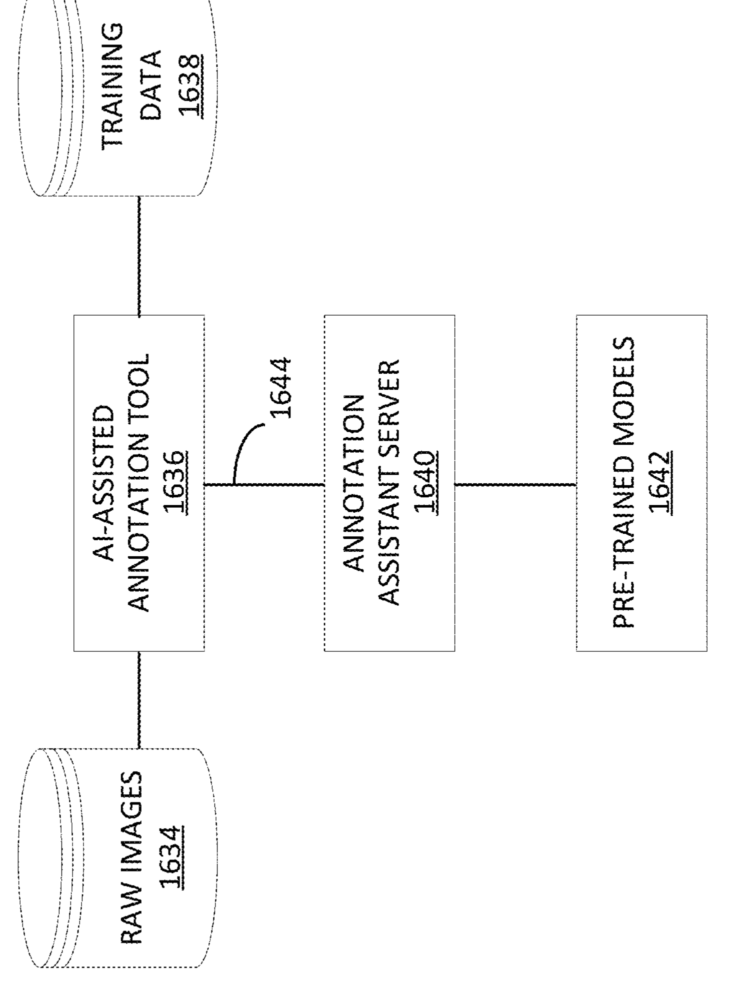
Figure 16B:

In at least one embodiment, training pipelines 1504 may include AI-assisted annotation, as described in more detail herein with respect to at least FIG. 16B. In at least one embodiment, labeled data 1412 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1408 (or other data type used by machine learning models), there may be corresponding ground truth data generated by training system 1404. In at least one embodiment, AI-assisted annotation may be performed as part of deployment pipelines 1510; either in addition to, or in lieu of AI-assisted annotation included in training pipelines 1504. In at least one embodiment, system 1500 may include a multi-layer platform that may include a software layer (e.g., software 1418) of diagnostic applications (or other application types) that may perform one or more medical imaging and diagnostic functions. In at least one embodiment, system 1500 may be communicatively coupled to (e.g., via encrypted links) PACS server networks of one or more facilities. In at least one embodiment, system 1500 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1402). In at least one embodiment, applications may then call or execute one or more services 1420 for performing compute, AI, or visualization tasks associated with respective applications, and software 1418 and/or services 1420 may leverage hardware 1422 to perform processing tasks in an effective and efficient manner.

In at least one embodiment, deployment system 1406 may execute deployment pipelines 1510. In at least one embodiment, deployment pipelines 1510 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1510 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1510 depending on information desired from data generated by a device. In at least one embodiment, where detections of anomalies are desired from an MRI machine, there may be a first deployment pipeline 1510, and where image enhancement is desired from output of an MRI machine, there may be a second deployment pipeline 1510.

In at least one embodiment, an image generation application may include a processing task that includes use of a machine learning model. In at least one embodiment, a user may desire to use their own machine learning model, or to select a machine learning model from model registry 1424. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1500—such as services 1420 and hardware 1422—deployment pipelines 1510 may be even more user friendly, provide for easier integration, and produce more accurate, efficient, and timely results.

In at least one embodiment, deployment system 1406 may include a user interface 1514 (e.g., a graphical user interface, a web interface, etc.) that may be used to select applications for inclusion in deployment pipeline(s) 1510, arrange applications, modify, or change applications or parameters or constructs thereof, use and interact with deployment pipeline(s) 1510 during set-up and/or deployment, and/or to otherwise interact with deployment system 1406. In at least one embodiment, although not illustrated with respect to training system 1404, user interface 1514 (or a different user interface) may be used for selecting models for use in deployment system 1406, for selecting models for training, or retraining, in training system 1404, and/or for otherwise interacting with training system 1404.

In at least one embodiment, pipeline manager 1512 may be used, in addition to an application orchestration system 1528, to manage interaction between applications or containers of deployment pipeline(s) 1510 and services 1420 and/or hardware 1422. In at least one embodiment, pipeline manager 1512 may be configured to facilitate interactions from application to application, from application to service 1420, and/or from application or service to hardware 1422. In at least one embodiment, although illustrated as included in software 1418, this is not intended to be limiting, and in some examples (e.g., as illustrated in FIG. 13) pipeline manager 1512 may be included in services 1420. In at least one embodiment, application orchestration system 1528 (e.g., Kubernetes, DOCKER, etc.) may include a container orchestration system that may group applications into containers as logical units for coordination, management, scaling, and deployment. In at least one embodiment, by associating applications from deployment pipeline(s) 1510 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1512 and application orchestration system 1528. In at least one embodiment, so long as an expected input and/or output of each container or application is known by a system (e.g., based on constructs of applications or containers), application orchestration system 1528 and/or pipeline manager 1512 may facilitate communication among and between, and sharing of resources among and between, each of applications or containers. In at least one embodiment, because one or more of applications or containers in deployment pipeline(s) 1510 may share same services and resources, application orchestration system 1528 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1528) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1420 leveraged by and shared by applications or containers in deployment system 1406 may include compute services 1516, AI services 1518, visualization services 1520, and/or other service types. In at least one embodiment, applications may call (e.g., execute) one or more of services 1420 to perform processing operations for an application. In at least one embodiment, compute services 1516 may be leveraged by applications to perform super-computing or other high-performance computing (HPC) tasks. In at least one embodiment, compute service(s) 1516 may be leveraged to perform parallel processing (e.g., using a parallel computing platform 1530) for processing data through one or more of applications and/or one or more tasks of a single application, substantially simultaneously. In at least one embodiment, parallel computing platform 1530 (e.g., NVIDIA's CUDA) may enable general purpose computing on GPUs (GPGPU) (e.g., GPUs 1522). In at least one embodiment, a software layer of parallel computing platform 1530 may provide access to virtual instruction sets and parallel computational elements of GPUs, for execution of compute kernels. In at least one embodiment, parallel computing platform 1530 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1530 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1518 may be leveraged to perform inferencing services for executing machine learning model(s) associated with applications (e.g., tasked with performing one or more processing tasks of an application). In at least one embodiment, AI services 1518 may leverage AI system 1524 to execute machine learning model(s) (e.g., neural networks, such as CNNs) for segmentation, reconstruction, object detection, feature detection, classification, and/or other inferencing tasks. In at least one embodiment, applications of deployment pipeline(s) 1510 may use one or more of output models 1416 from training system 1404 and/or other models of applications to perform inference on imaging data. In at least one embodiment, two or more examples of inferencing using application orchestration system 1528 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1528 may distribute resources (e.g., services 1420 and/or hardware 1422) based on priority paths for different inferencing tasks of AI services 1518.

In at least one embodiment, shared storage may be mounted to AI services 1518 within system 1500. In at least one embodiment, shared storage may operate as a cache (or other storage device type) and may be used to process inference requests from applications. In at least one embodiment, when an inference request is submitted, a request may be received by a set of API instances of deployment system 1406, and one or more instances may be selected (e.g., for best fit, for load balancing, etc.) to process a request. In at least one embodiment, to process a request, a request may be entered into a database, a machine learning model may be located from model registry 1424 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1512) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<11 min). In at least one embodiment, model execution times may be measured from requesting institution or entity and may include partner network traversal time, as well as execution on an inference service.

In at least one embodiment, transfer of requests between services 1420 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1526, and an inference service may perform inferencing on a GPU.

In at least one embodiment, visualization services 1520 may be leveraged to generate visualizations for viewing outputs of applications and/or deployment pipeline(s) 1510. In at least one embodiment, GPUs 1522 may be leveraged by visualization services 1520 to generate visualizations. In at least one embodiment, rendering effects, such as ray-tracing, may be implemented by visualization services 1520 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1520 may include an internal visualizer, cinematics, and/or other rendering or image processing capabilities or functionality (e.g., ray tracing, rasterization, internal optics, etc.).

In at least one embodiment, hardware 1422 may include GPUs 1522, AI system 1524, cloud 1526, and/or any other hardware used for executing training system 1404 and/or deployment system 1406. In at least one embodiment, GPUs 1522 (e.g., NVIDIA's TESLA and/or QUADRO GPUs) may include any number of GPUs that may be used for executing processing tasks of compute services 1516, AI services 1518, visualization services 1520, other services, and/or any of features or functionality of software 1418. For example, with respect to AI services 1518, GPUs 1522 may be used to perform pre-processing on imaging data (or other data types used by machine learning models), post-processing on outputs of machine learning models, and/or to perform inferencing (e.g., to execute machine learning models). In at least one embodiment, cloud 1526, AI system 1524, and/or other components of system 1500 may use GPUs 1522. In at least one embodiment, cloud 1526 may include a GPU-optimized platform for deep learning tasks. In at least one embodiment, AI system 1524 may use GPUs, and cloud 1526—or at least a portion tasked with deep learning or inferencing—may be executed using one or more AI systems 1524. As such, although hardware 1422 is illustrated as discrete components, this is not intended to be limiting, and any components of hardware 1422 may be combined with, or leveraged by, any other components of hardware 1422.

In at least one embodiment, AI system 1524 may include a purpose-built computing system (e.g., a super-computer or an HPC) configured for inferencing, deep learning, machine learning, and/or other artificial intelligence tasks. In at least one embodiment, AI system 1524 (e.g., NVIDIA's DGX) may include GPU-optimized software (e.g., a software stack) that may be executed using a plurality of GPUs 1522, in addition to DPUs, CPUs, RAM, storage, and/or other components, features, or functionality. In at least one embodiment, one or more AI systems 1524 may be implemented in cloud 1526 (e.g., in a data center) for performing some or all of AI-based processing tasks of system 1500.

In at least one embodiment, cloud 1526 may include a GPU-accelerated infrastructure (e.g., NVIDIA's NGC) that may provide a GPU-optimized platform for executing processing tasks of system 1500. In at least one embodiment, cloud 1526 may include an AI system(s) 1524 for performing one or more of AI-based tasks of system 1500 (e.g., as a hardware abstraction and scaling platform). In at least one embodiment, cloud 1526 may integrate with application orchestration system 1528 leveraging multiple GPUs to enable seamless scaling and load balancing between and among applications and services 1420. In at least one embodiment, cloud 1526 may tasked with executing at least some of services 1420 of system 1500, including compute services 1516, AI services 1518, and/or visualization services 1520, as described herein. In at least one embodiment, cloud 1526 may perform small and large batch inference (e.g., executing NVIDIA's TENSOR RT), provide an accelerated parallel computing API and platform 1530 (e.g., NVIDIA's CUDA), execute application orchestration system 1528 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1500.

FIG. 16A illustrates a data flow diagram for a process 1600 to train, retrain, or update a machine learning model, in accordance with at least one embodiment. In at least one embodiment, process 1600 may be executed using, as a non-limiting example, system 1500 of FIG. 15. In at least one embodiment, process 1600 may leverage services 1420 and/or hardware 1422 of system 1500, as described herein. In at least one embodiment, refined models 1612 generated by process 1600 may be executed by deployment system 1406 for one or more containerized applications in deployment pipelines 1510.

In at least one embodiment, model training 1414 may include retraining or updating an initial model 1604 (e.g., a pre-trained model) using new training data (e.g., new input data, such as customer dataset 1606, and/or new ground truth data associated with input data). In at least one embodiment, to retrain, or update, initial model 1604, output or loss layer(s) of initial model 1604 may be reset, or deleted, and/or replaced with an updated or new output or loss layer(s). In at least one embodiment, initial model 1604 may have previously fine-tuned parameters (e.g., weights and/or biases) that remain from prior training, so training or retraining 1414 may not take as long or require as much processing as training a model from scratch. In at least one embodiment, during model training 1414, by having reset or replaced output or loss layer(s) of initial model 1604, parameters may be updated and re-tuned for a new data set based on loss calculations associated with accuracy of output or loss layer(s) at generating predictions on new, customer dataset 1606 (e.g., image data 1408 of FIG. 14).

In at least one embodiment, pre-trained models 1506 may be stored in a data store, or registry (e.g., model registry 1424 of FIG. 14). In at least one embodiment, pre-trained models 1506 may have been trained, at least in part, at one or more facilities other than a facility executing process 1600. In at least one embodiment, to protect privacy and rights of patients, subjects, or clients of different facilities, pre-trained models 1506 may have been trained, on-premise, using customer or patient data generated on-premise. In at least one embodiment, pre-trained models 1506 may be trained using cloud 1526 and/or other hardware 1422, but confidential, privacy protected patient data may not be transferred to, used by, or accessible to any components of cloud 1526 (or other off premise hardware). In at least one embodiment, where a pre-trained model 1506 is trained at using patient data from more than one facility, pre-trained model 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1506 on-premise and/or off premise, such as in a datacenter or other cloud computing infrastructure.

In at least one embodiment, when selecting applications for use in deployment pipelines 1510, a user may also select machine learning models to be used for specific applications. In at least one embodiment, a user may not have a model for use, so a user may select a pre-trained model 1506 to use with an application. In at least one embodiment, pre-trained model 1506 may not be optimized for generating accurate results on customer dataset 1606 of a facility of a user (e.g., based on patient diversity, demographics, types of medical imaging devices used, etc.). In at least one embodiment, prior to deploying pre-trained model 1506 into deployment pipeline 1510 for use with an application(s), pre-trained model 1506 may be updated, retrained, and/or fine-tuned for use at a respective facility.

In at least one embodiment, a user may select pre-trained model 1506 that is to be updated, retrained, and/or fine-tuned, and pre-trained model 1506 may be referred to as initial model 1604 for training system 1404 within process 1600. In at least one embodiment, customer dataset 1606 (e.g., imaging data, genomics data, sequencing data, or other data types generated by devices at a facility) may be used to perform model training 1414 (which may include, without limitation, transfer learning) on initial model 1604 to generate refined model 1612. In at least one embodiment, ground truth data corresponding to customer dataset 1606 may be generated by training system 1404. In at least one embodiment, ground truth data may be generated, at least in part, by clinicians, scientists, doctors, practitioners, at a facility (e.g., as labeled clinic data 1412 of FIG. 14).

In at least one embodiment, AI-assisted annotation 1410 may be used in some examples to generate ground truth data. In at least one embodiment, AI-assisted annotation 1410 (e.g., implemented using an AI-assisted annotation SDK) may leverage machine learning models (e.g., neural networks) to generate suggested or predicted ground truth data for a customer dataset. In at least one embodiment, user 1610 may use annotation tools within a user interface (a graphical user interface (GUI)) on computing device 1608.

In at least one embodiment, user 1610 may interact with a GUI via computing device 1608 to edit or fine-tune (auto)annotations. In at least one embodiment, a polygon editing feature may be used to move vertices of a polygon to more accurate or fine-tuned locations.

In at least one embodiment, once customer dataset 1606 has associated ground truth data, ground truth data (e.g., from AI-assisted annotation, manual labeling, etc.) may be used by during model training 1414 to generate refined model 1612. In at least one embodiment, customer dataset 1606 may be applied to initial model 1604 any number of times, and ground truth data may be used to update parameters of initial model 1604 until an acceptable level of accuracy is attained for refined model 1612. In at least one embodiment, once refined model 1612 is generated, refined model 1612 may be deployed within one or more deployment pipelines 1510 at a facility for performing one or more processing tasks with respect to medical imaging data.

In at least one embodiment, refined model 1612 may be uploaded to pre-trained models 1506 in model registry 1424 to be selected by another facility. In at least one embodiment, his process may be completed at any number of facilities such that refined model 1612 may be further refined on new datasets any number of times to generate a more universal model.

FIG. 16B is an example illustration of a client-server architecture 1632 to enhance annotation tools with pre-trained annotation models, in accordance with at least one embodiment. In at least one embodiment, AI-assisted annotation tools 1636 may be instantiated based on a client-server architecture 1632. In at least one embodiment, annotation tools 1636 in imaging applications may aid radiologists, for example, identify organs and abnormalities. In at least one embodiment, imaging applications may include software tools that help user 1610 to identify, as a non-limiting example, a few extreme points on a particular organ of interest in raw images 1634 (e.g., in a 3D MRI or CT scan) and receive auto-annotated results for all 2D slices of a particular organ. In at least one embodiment, results may be stored in a data store as training data 1638 and used as (for example and without limitation) ground truth data for training. In at least one embodiment, when computing device 1608 sends extreme points for AI-assisted annotation 1410, a deep learning model, for example, may receive this data as input and return inference results of a segmented organ or abnormality. In at least one embodiment, pre-instantiated annotation tools, such as AI-Assisted Annotation Tool 1636B in FIG. 16B, may be enhanced by making API calls (e.g., API Call 1644) to a server, such as an Annotation Assistant Server 1640 that may include a set of pre-trained models 1642 stored in an annotation model registry, for example. In at least one embodiment, an annotation model registry may store pre-trained models 1642 (e.g., machine learning models, such as deep learning models) that are pre-trained to perform AI-assisted annotation on a particular organ or abnormality. These models may be further updated by using training pipelines 1504. In at least one embodiment, pre-installed annotation tools may be improved over time as new labeled clinic data 1412 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

tracking, using an object tracking application that implements an object tracker of a first object tracker type, a state of one or more objects included in an environment based at least on images depicting the environment, wherein the first object tracker type is one of a set of object tracker types comprising two or more of: a location-based object tracker type, a simple, online, real-time (SORT) object tracker type, a visual feature-based object tracker type, or a discriminative correlation feature (DCF) object tracker type;

receiving a request to perform tracking using a second object tracker type of the set of object tracker types, wherein the second object tracker type is different from the first object tracker type;

configuring the object tracking application to implement an object tracker of the second object tracker type in accordance with the request; and tracking, using the object tracking application that implements the object tracker of the second object tracker type, the state of the objects included in the environment based on the images depicting the environment.

2. The method of claim 1, wherein configuring the object tracking application to implement an object tracker of the second object tracker type comprises:

identifying a configuration file associated with the object tracking application; and updating values of one or more parameters of the identified configuration file.

3. The method of claim 2, further comprising:

identifying one or more user-provided configuration settings associated with the second object tracker type, wherein the values of the one or more parameters of the identified configuration file are updated based on the identified one or more user-provided configuration settings.

4. The method of claim 2, further comprising:

determining conditions of at least one of a computing system that executes the object tracking application or the environment that includes the one or more objects, wherein the values of the one or more parameters of the identified configuration file are updated based on the determined conditions.

5. The method of claim 1, wherein an object tracker of the first object tracker type is configured to:

identify a region of a respective image depicting the environment that includes a detected object;

determine a target region of the respective image that is expected to include the detected object;

calculate a visual similarity metric value based on a visual similarity between pixels included in the region of the respective image that includes the detected object and pixels included in the target region of the respective image that is expected to include the detected object; and provide an indication of the region of the respective image that includes the detected object, the identified region of the image that is expected to include the detected object and the calculated visual similarity metric value.

6. The method of claim 5, wherein configuring the object tracking application to implement an object tracker of the second object tracker type comprises:

obtaining a current image depicting the environment and an indication of a region of the current image that includes an additional detected object;

providing the current image and the indication of the region of the current image that includes the additional detected object as input to a machine learning model trained to perform feature extraction based on a given input image;

obtaining, based on one or more outputs of the machine learning model, a set of features associated with the additional detected object; and calculating a feature similarity metric value based on a similarity between the set of features associated with the additional detected object included in the current image and another set of features associated with the additional detected object included in a prior image depicting the environment.

7. The method of claim 6, further comprising:

providing an indication of the region of the current image that includes the additional detected object and the calculated feature similarity metric value.

8. The method of claim 1, wherein the object tracking application comprises a data association application module and a target tracking application module, wherein the data association application module is configured to generate one or more associations between data corresponding to an object in view of a current image depicting the environment and data corresponding to the object in view of a prior image depicting the environment, and wherein the target tracking application module is configured to monitor a state of the object based on the one or more associations.

9. A system comprising:

memory; and a set of one or more processing devices operatively connected to the memory, the set of one or more processing devices to:

track, using an object tracking application that implements an object tracker of a first object tracker type, a state of one or more objects included in an environment based at least on images depicting the environment, wherein the first object tracker type is one of a set of object tracker types comprising two or more of: a location-based object tracker type, a simple, online, real-time (SORT) object tracker type, a visual feature-based object tracker type, or a discriminative correlation feature (DCF) object tracker type;

receive a request to perform tracking using a second object tracker type of the set of object tracker types, wherein the second object tracker type is different from the first object tracker type;

configure the object tracking application to implement an object tracker of the second object tracker type in accordance with the request; and track, using the object tracking application that implements the object tracker of the second object tracker type, the state of the objects included in the environment based on the images depicting the environment.

10. The system of claim 9, wherein to configure the object tracking application to implement an object tracker of the second object tracker type, the set of one or more processing devices is to:

identify a configuration file associated with the object tracking application; and update values of one or more parameters of the identified configuration file.

11. The system of claim 10, wherein the set of one or more processing devices is further to:

identify one or more user-provided configuration settings associated with the second object tracker type, wherein the values of the one or more parameters of the identified configuration file are updated based on the identified one or more user-provided configuration settings.

12. The system of claim 10, wherein the set of one or more processing devices is further to:

determine conditions of at least one of a computing system that executes the object tracking application or the environment that includes the one or more objects, wherein the values of the one or more parameters of the identified configuration file are updated based on the determined conditions.

13. The system of claim 9, wherein an object tracker of the first object tracker type is configured to:

identify a region of a respective image depicting the environment that includes a detected object;

determine a target region of the respective image that is expected to include the detected object;

calculate a visual similarity metric value based on a visual similarity between pixels included in the region of the respective image that includes the detected object and pixels included in the target region of the respective image that is expected to include the detected object; and provide an indication of the region of the respective image that includes the detected object, the identified region of the image that is expected to include the detected object and the calculated visual similarity metric value.

14. The system of claim 13, wherein to configure the object tracking application to implement an object tracker of the second object tracker type, the set of one or more processing devices is to:

obtain a current image depicting the environment and an indication of a region of the current image that includes an additional detected object;

provide the current image and the indication of the region of the current image that includes the additional detected object as input to a machine learning model trained to perform feature extraction based on a given input image;

obtain, based on one or more outputs of the machine learning model, a set of features associated with the additional detected object; and calculate a feature similarity metric value based on a similarity between the set of features associated with the additional detected object included in the current image and another set of features associated with the additional detected object included in a prior image depicting the environment.

15. A system comprising:

a memory device comprising a plurality of libraries associated with an object tracker application, wherein each of the plurality of libraries corresponds to one or more respective object tracker types of a plurality of object tracker types; and a set of one or more processing devices coupled to the memory device, the set of one or more processing devices to:

provide a user interface (UI) to a client device, wherein the UI comprises a plurality of UI elements that are each associated with an application module for the object tracker application, each application module corresponding to one or more distinct object tracker types of the plurality of object tracker types;

responsive to detecting a user interaction with at least one of the plurality of UI elements, receive a request to configure the object tracking application to execute a set of application modules, wherein the set of application modules comprises one or more application modules associated with the at least one of the plurality of UI elements;

initialize the set of application modules based on one or more libraries of the plurality of libraries;

configure the object tracking application to execute the initialized set of application modules; and provide the configured object tracking application in accordance with the request.

16. The system of claim 15, wherein the plurality of object tracker types comprises one or more of a location-based object tracker type, a simple, online, real-time (SORT) object tracker type, a visual feature-based object tracker type, or a discriminative correlation feature (DCF) object tracker type.

17. The system of claim 15, wherein the UI further comprises one or more additional UI elements that enable a user to provide values for one or more configuration settings associated with a respective application module for the object application tracker, and wherein the set of one or more processing devices is further to:

receive an indication of the user-provided values for the one or more configuration settings associated with the set of application modules corresponding to the at least one of the plurality of UI elements, wherein the set of application modules is further initialized based on the one or more configuration settings.

18. The system of claim 15, wherein each of the plurality of UI elements corresponds to a particular object tracker type of the plurality of object tracker types, and wherein the user interaction is detected with respect to a UI element of the plurality of UI elements corresponding to a particular object tracker type.

19. The system of claim 15, wherein each of the plurality of UI elements corresponds to a respective application module for one or more of the plurality of object tracker types, and wherein the user interaction is detected with respect to multiple UI elements of the plurality of UI elements.

20. The system of claim 15, wherein the set of application modules comprises at least one of a data association module, a target manager module, an object localization module, a data extraction module, a state estimation module, or a tracklet manager module.

* * * * *